(12) United States Patent
Nagao

(10) Patent No.: US 7,922,385 B2
(45) Date of Patent: Apr. 12, 2011

(54) PIEZOELECTRIC DRIVE DEVICE AND ELECTRONIC DEVICE

(75) Inventor: Shoichi Nagao, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/039,252

(22) Filed: Feb. 28, 2008

(65) Prior Publication Data

US 2008/0212415 A1 Sep. 4, 2008

(30) Foreign Application Priority Data

Mar. 1, 2007 (JP) ................................. 2007-051312
Oct. 26, 2007 (JP) ................................. 2007-278763

(51) Int. Cl.
*G04C 3/12* (2006.01)
(52) U.S. Cl. ........ 368/128; 368/125; 368/255; 310/311; 310/323.06; 310/329
(58) Field of Classification Search .................. 368/128, 368/204; 310/345
See application file for complete search history.

(56) References Cited

U.S. PATENT DOCUMENTS

| 6,266,296 | B1 * | 7/2001 | Miyazawa ...................... 368/28 |
| 6,885,615 | B1 * | 4/2005 | Miyazawa et al. ............. 368/255 |
| 2007/0008829 | A1 * | 1/2007 | Kitahara et al. .............. 368/255 |

FOREIGN PATENT DOCUMENTS

| CA | 2605937 A1 | 8/2006 |
| DE | 102004056989 A1 | 6/2006 |
| EP | 1612922 A1 | 1/2006 |
| EP | 1962310 A1 | 8/2008 |
| JP | H10-290579 A | 10/1998 |

* cited by examiner

*Primary Examiner* — Renee Luebke
*Assistant Examiner* — Jason Collins
(74) *Attorney, Agent, or Firm* — Global IP Counselors, LLP

(57) ABSTRACT

A piezoelectric drive device has a piezoelectric actuator that has a vibrator with a piezoelectric element, and a rotor that is rotated by the vibrator, an elastic device that can store the rotational energy of the rotor as elastic energy, and a driven body that is rotated by the elastic energy stored by the elastic device.

17 Claims, 23 Drawing Sheets

PIEZOELECTRIC DRIVE DEVICE AND ELECTRONIC DEVICE

CROSS-REFERENCE TO THE RELATED APPLICATIONS

This application claims priority to Japanese Patent Application Nos. 2007-051312 and 2007-278763. The entire disclosure of Japanese Patent Application No. 2007-051312 and 2007-278763 is hereby incorporated herein by reference.

BACKGROUND

1. Technical Field

The present invention relates to a piezoelectric drive device having a piezoelectric actuator, and to an electronic device.

2. Related Art

Ultrasonic drive devices that use piezoelectric elements resistant to the effects of magnetism and are used as a drive device for driving the hands in a timepiece are known from the literature. Japanese Laid-Open Patent Publication JP-10-290579-A discloses such device as an example.

While the rotor starts rotating when a high frequency voltage (drive signal) is applied to the vibrator in order to start the ultrasonic drive device disclosed in JP-A-H10-290579 from a stopped state, a certain amount of time (acceleration time) is needed for the rotor to reach a prescribed speed. This acceleration time increases as the moment of inertia of the hands or other driven body increases. For example, when a speed reducing wheel train for slowing the speed of the rotor is located between the rotor and the hands, the moment of inertia of the wheel train and hands is relatively larger than the moment of inertia of the rotor, and the combined inertial moment of the rotor, a speed reducing wheel train, and the hands is from ten to one-hundred times larger than the inertial moment of the rotor alone.

Other arrangements have a speed increasing wheel train between the rotor and the hands so that the hands can be moved a prescribed angle even when the angle of rotor rotation is small. For example, this enables advancing the second hand the 6° angle equal to one second by advancing the rotor only 2°. The inertial moment imposed by a speed increasing wheel train is even greater than a speed reducing wheel train, and the acceleration time is therefore also longer.

The inertial moment is thus determined by the arrangement and form of the wheel train and hands, for example, the acceleration time of the rotor increases as the moment of inertia rises, the drive signal must therefore be applied to the vibrator (oscillator) longer, and power consumption by the ultrasonic drive device increases.

SUMMARY

The present invention was conceived in light of the above-mentioned problems. One object of the present invention is to provide a piezoelectric drive device with which an elastic device is utilized.

In accordance with one aspect of the present invention, a piezoelectric drive device includes a piezoelectric actuator, a rotor, an elastic device, and a driven body. The piezoelectric actuator has a vibrator. The rotor is configured to be rotated by the piezoelectric actuator. The elastic device has elasticity and stores rotational energy of the rotor. The driven body is configured to be rotated by the elastic device.

The vibrator vibrates when at least a drive signal is applied to the piezoelectric element, and is disposed so that the resulting vibration makes the rotor to rotate. The vibrator can be constructed so that the piezoelectric element itself vibrates and makes the rotor to rotate, or so that a lamination of a flat piezoelectric elements and a reinforcing plate vibrates and makes the rotor to rotate.

With the elastic device of the present invention, it is possible that a driven body or rotating target object with a relatively large inertial moment is not driven directly by the piezoelectric actuator when the piezoelectric actuator is started from a dead stop. The inertial moment of a part that is directly rotated by the piezoelectric actuator is decreased by the inertial moment of the driven body or the rotating target object.

The driven body is any object to which rotor rotation is transferred by the elastic device and then transmits this rotation to a rotating target object. For example, the driven body could be a rotor transmission wheel, an escape wheel, or a follower that is disposed on a rotation transmission path from the rotor to a hand or other rotating target, or it could be a rotor transmission wheel or rotor wheel that shares a common axle with the rotor.

Note that "rotational energy" as used herein includes torque, and "elastic energy" includes elastic force.

The piezoelectric drive device according to another aspect of the invention preferably also has a rotation limiting device that limits an angle of rotation of the driven body to a prescribed angle.

When the hands of a timepiece are driven using a piezoelectric actuator, moving the hands a prescribed interval is extremely important. Therefore, if a piezoelectric drive device using a piezoelectric actuator cannot drive in steps of a constant angle, the position of the hands will shift and this is a major problem.

In this aspect of the invention driving the rotor makes the driven body to rotate, and the rotation limiting device limits rotation of the driven body to a constant angle. As a result, even if rotation of the driven body is not constant relative to a given amount the piezoelectric actuator is driven, the angle of rotation of the driven body is limited to a constant angle by the rotation limiting device once the driven body has rotated a specific angle, and rotation of the driven body is therefore constant. Overrun of the driven body that is rotated by the piezoelectric actuator can therefore be prevented, the precision of the angle of rotation of the driven body can be improved without needing to precisely control the angle of rotation of the rotor, and the display precision of the hand or other indicator means that is rotated by the driven body can be improved.

The rotation limiting device is not limited to limiting the angle of rotation of the driven body to a constant angular interval, and could be a rotation limiting device that is arranged so that the angle of rotation that is limited varies as in an automaton clock. More specifically, the rotation limiting device only needs to limit the angle of rotation of the driven body to a set prescribed angle.

The piezoelectric drive device according to another aspect of the invention preferably also has a first transmission path whereby the rotational energy of the rotor is transmitted to the rotation limiting device without passing through the elastic device, and a second transmission path whereby the rotational energy of the rotor is transmitted to the elastic device.

The piezoelectric drive device according to this aspect of the invention has a first transmission path whereby the rotational energy of the rotor is transmitted to the rotation limiting device, and a second transmission path whereby the rotational energy of the rotor is transmitted to the elastic device, and can use a common drive power source to drive both the driven body and the rotation limiting device. The parts count can therefore be reduced and the device size can be reduced.

The piezoelectric drive device according to another aspect of the invention the rotation limiting device is preferably engaged with the driven body.

With this aspect of the invention the rotation limiting device only needs to be able to limit rotation of at least the driven body. For example, the rotation limiting device and driven body can be disposed so that the angle of rotation of the driven body is directly limited by the rotation limiting device, or the rotation limiting device and driven body can be disposed so that the rotation limiting device limits the angle of rotation of a separate rotating body to which drive power is transmitted from the driven body. Further alternatively, the rotation limiting device can limit the angle of rotation of a rotating body that is disposed coaxially to the driven body. This aspect of the invention thus affords greater freedom arranging the rotation limiting device and the driven body.

In the piezoelectric drive device according to another aspect of the invention the driven body is an escape wheel, and the rotation limiting device is a pallet fork.

This aspect of the invention realizes an escapement with the escape wheel and pallet fork. If the piezoelectric actuator drives the escape wheel, the escape wheel can be accurately driven a desired rotational distance.

The piezoelectric drive device according to another aspect of the invention preferably also has a cam member that engages the pallet fork and is driven by the piezoelectric actuator, and is configured so that the pallet fork swings once bidirectionally when the cam member rotates once.

Because the cam member driven by the piezoelectric actuator makes the pallet fork to operate in two directions, this aspect of the invention can cause the pallet fork to swing bidirectionally by rotating the cam member one revolution in one direction. The actuator used as the drive source can therefore rotate in one direction and does not need to rotate in both directions. For example, if the piezoelectric actuator has a flat rectangular vibrator, the position where the piezoelectric actuator contacts the rotor can be freely selected to rotate in one direction, drive power transfer efficiency is thus improved, thus promoting low power consumption and high torque.

In the case of bidirectional rotation, the contact unit protrudes from approximately the middle of the short side of a rectangular piezoelectric element, and the contact unit is disposed facing the center of the rotor. To drive in only one direction, the contact unit is offset to one side from the center of the rotor, and can therefore produce greater torque on the rotor relative to piezoelectric element movement. In other words, drive power can be transmitted with high efficiency in only one direction.

In the piezoelectric drive device according to another aspect of the invention the driven body and the rotation limiting device preferably form a Geneva mechanism.

With this aspect of the invention the driven body can be driven intermittently without being affected by variation in the angle of rotation of the rotor, and a hand or other object can be driven the precise angle of rotation of one step.

In the piezoelectric drive device according to another aspect of the invention the elastic device is preferably a spiral spring.

The spiral spring can be a power spring or a hairspring such as used in a timepiece.

Because a spiral spring is used as the elastic device, the elastic device (spiral spring) can be incorporated without particularly increasing the required installation space compared with an arrangement that uses a U-shaped spring or a cantilevered spring even if the number of windings in the spiral spring is increased in order to assure a large displacement.

In addition, substantially constant elastic energy can be produced irrespective of the displacement of the elastic device if a large displacement is assured. Because the driven body receives substantially constant elastic energy from the elastic device regardless of the magnitude of any external shock, operation of the driven body can be stabilized.

The piezoelectric drive device according to another aspect of the invention preferably also has a rotor transmission wheel to which rotor rotation is transmitted. The rotor transmission wheel and the driven body are disposed on the same axle, and the elastic device has one end (first end) engaged with the rotor transmission wheel and the other end (second end) engaged with the driven body.

Examples of the elastic device include a spiral spring, a U-shaped spring, a cantilevered spring, a coil spring, and other types of spring members. Further alternatively, a rubber member can be used as the elastic device. The elastic device is disposed so that it can be elastically deformed by drive power from the rotor.

By disposing the elastic device between the rotor transmission wheel and coaxially disposed driven body, this aspect of the invention realizes the elastic device compactly.

If the elastic device is located between the driven body and a wheel (rotor pinion) disposed on the same axle as the rotor, thickness will increase as a result of axially stacking the rotor, rotor pinion, elastic device, and driven body. By disposing the rotor transmission wheel and the rotor on separate axles, however, only the rotor transmission wheel, elastic device, and driven body are stacked together in this aspect of the invention, and the thickness can be reduced by the thickness of the rotor that is not stacked with them.

In the piezoelectric drive device according to another aspect of the invention the rotor and the driven body are disposed on the same axle, and the elastic device has one end engaged with the rotor and the other end engaged with the driven body.

Compared with an arrangement in which a separate rotating body for transmitting drive power from the rotor to the elastic device is disposed between the rotor and the elastic device, and drive power is transmitted through this separate rotating body to the driven body, this aspect of the invention can reduce the load on the rotor by the inertial moment of the separate rotating body by disposing the axle of the rotor and the axle of the driven body coaxially. The rotor can therefore be driven faster by the amount of the reduced inertial moment, power can be supplied for a shorter time to drive the rotor a prescribed amount, and power consumption can therefore be reduced.

In the piezoelectric drive device according to another aspect of the invention the elastic device has an initial deflection, and a release limiting unit that holds the initial deflection is formed to the rotor transmission wheel and driven body, or to the rotor and driven body.

The release limiting unit in this aspect of the invention holds the elastic device in the initial elastic deformation state (the initial deflection state). To describe the behavior of the rotor and driven body, the rotor starts rotating first when starting, and the driven body starts rotating after a delay caused by the moment of inertia. If a release limiting unit is provided in this arrangement, the force of the initial deflection constantly works on the driven body. This can suppress vibration of the driven body by external shocks, and can prevent the position indicated by the timepiece hand, for example, that is connected to the driven body from moving. The force produced by the initial deflection of the elastic device is preferably at least great enough to rotate the driven body.

More specifically, if the release limiting unit has a pin as an engaging part affixed to the driven body, and an elongated hole as an engaged part that is long in the direction of relative movement of a pin disposed to the rotor, the driven body is rotated by the elastic energy of the elastic device to where the pin contacts the inside wall of the long hole and is held in this position. Vibration of the driven body can thus be reliably suppressed. For example, if the elastic device is not used, and the rotor and driven body are mutually engaged gear wheels, chatter equal to the gap between the mated teeth of the wheels occurs in the driven body. This makes the display position of the hand inaccurate when a timepiece hand, for example, is attached to the driven body. However, if the rotor and the driven body are connected through the elastic device, and the initial elastic deformation (initial deflection) of the elastic device is held by the release limiting unit, chatter between the rotor and driven body is eliminated and the timepiece hand can display accurately.

Furthermore, compared with the rotor and driven body being directly connected by gear wheels, interposing the elastic device eliminates variation in the gaps where the wheels mate that is caused by manufacturing deviations in the tooth spaces of the wheels, and the rotor and driven body are not subject to the effects of variation in the manufacturing precision of the parts.

Furthermore, if an elastic device is provided but there is no initial elastic deformation, the driven body vibrates easily when an external shock is applied even if rotation of the rotor is limited when the piezoelectric actuator is stopped because the elastic energy of the elastic device is not applied to the driven body. However, if the elastic device is held with initial elastic deformation, the force of this initial elastic deformation is applied to the driven body and can prevent external shock, for example, from causing the driven body to vibrate. Furthermore, even if the magnitude of the external impact is great enough to elastically deform the elastic device, there is no problem if the state in which the force of the original initial elastic deformation acts on the driven body is restored by the elastic device returning to the initial state.

In the piezoelectric drive device according to another aspect of the invention the release limiting unit has looseness permitting rotation of the rotor transmission wheel or the rotor only in the direction increasing the deflection of the elastic device, and the maximum deflection of the elastic device is set according to the looseness in the release limiting unit.

If the deflection of the elastic device is not limited, the driven body that is rotated by the elastic energy could overrun the prescribed angle of rotation if too much elastic energy is stored in the elastic device. However, because the maximum deflection of the elastic device is set by the looseness in the release limiting unit in this aspect of the invention, storing excessive elastic energy is prevented and overrun of the driven body can be prevented.

Furthermore, if the looseness is set to an amount corresponding to the prescribed rotation of the rotation, rotation of the driven body starts regardless of the magnitude of the inertial moment of the driven body when the rotor rotates at least a prescribed amount, and the starting performance of the driven body is improved.

In the piezoelectric drive device according to another aspect of the invention the piezoelectric actuator drives in steps, and the looseness in the release limiting unit is the amount of rotation of the rotor transmission wheel or the rotor corresponding to at least one drive step of the piezoelectric actuator.

When the rotor is driven by a piezoelectric actuator and the inertial moment of the rotating system after the driven body is relatively small, such as when the rotating target object is affixed directly to the driven body, the driven body also starts rotating in conjunction with rotation of the rotor, and there is no particular problem. However, if the inertial moment of the rotating system downstream from the driven body is large, such as when the rotating target object downstream from the driven body is large or the transmission path after the driven body is composed of a plurality of driven bodies, the driven body does not start rotating immediately with rotation of the rotor, and problems can result.

When the piezoelectric actuator is energized to drive in steps, that is, to drive at a constant interval, the invention sets the range of looseness in the release limiting unit to a range equal to at least the rotation of the rotor in one drive cycle. Therefore, even if the moment of inertia downstream from the driven body is relatively high, an increase in the load on the rotor due to interference between the rotor and the driven body can be avoided.

More specifically, setting the range of looseness to less than the range corresponding to rotation in one cycle requires more time for the rotor to start rotating and the driven body to follow the rotation of the rotor. Therefore, if the driven body does not start rotating even though the rotor has rotated the distance of one cycle, the elastic device cannot be elastically deformed before the rotor rotates the amount of one cycle, and the inertia of the driven body is applied to the rotor. However, by setting an amount of looseness at least equal to the amount of rotation in one cycle of the piezoelectric actuator as in the present invention, an increase in the load on the rotor can be prevented.

One cycle of the piezoelectric actuator in an intermittently driven piezoelectric actuator means the period from when drive starts, drive stops, and drive then starts again. In other words, driving the piezoelectric actuator one step is one drive cycle of the piezoelectric actuator.

Rotation of the rotor in one cycle means how far the rotor rotates when the piezoelectric actuator that rotationally drives the rotor is driven one step, that is, one cycle.

In the piezoelectric drive device according to another aspect of the invention a swinging means that is swung alternately in first and second directions by the driven body, and a second driven body that is rotated in a constant direction by the swinging means each time the swinging means swings in the first and second directions. The swinging means has a rotation limiting unit that limits the angle of rotation of the second driven body to a constant angle.

The mechanism by the swinging means and the second driven body is a reverse escapement. A problem with a reverse escapement is that the load on the piezoelectric actuator is high. More specifically, unlike the escapement of a mechanical timepiece, a reverse escapement transmits drive power from the pallet fork to the escape wheel, and there is a significant drop in drive power transmission efficiency compared with transmission by means of gear wheels. This is because for mechanical reasons the angle of intersection between the direction of force when the claw of the pallet fork contacts a tooth of the escape wheel and the direction of escape wheel rotation is large. As a result, the load on the piezoelectric actuator increases, drive speed drops, and more time is needed to advance the desired number of steps.

By interposing an elastic device, however, the invention can reduce the load on the piezoelectric actuator and increase the speed of the rotor, shorten the time needed to drive the desired number of steps, and reduce power consumption.

In the piezoelectric drive device according to another aspect of the invention the vibrator is formed as a flat plate and has a contact unit that contacts the outside surface of the rotor, and the piezoelectric drive device also has a pressure means that pushes either one of the vibrator and the rotor to the other of the vibrator and the rotor.

In this aspect of the invention the vibrator can be any flat shape including a diamond, a trapezoid, or a parallelogram, for example. The contact unit is also simply used to contact at least the outside surface of the rotor, and can be formed protruding from an end part of the plate vibrator or from a corner part of the plate vibrator.

In addition, the rotor can be pushed to the vibrator by means of the pressure means, or the vibrator can be pushed to the rotor. The direction of pressure exerted by the pressure means is substantially perpendicular to the rotational axis of the rotor, and the direction of this pressure is preferably coplanar to the vibration direction of the vibrator.

Because the vibrator is formed as a flat plate, the invention further promotes reducing the thickness of the piezoelectric drive device. Furthermore, by providing a pressure means, friction between the contact unit and the rotor surface can be increased, and the drive power produced by the vibration of the vibrator causing the rotor to rotate can be reliably transmitted.

Another aspect of the invention is an electronic device that has the piezoelectric drive device described above, and a driven unit that is driven by the piezoelectric drive device.

This aspect of the invention affords an electronic device that uses the piezoelectric drive device as a driver. This arrangement prevents driving the driven unit by means of the piezoelectric drive device from being affected by magnetic fields, and can reduce power consumption when driving the electronic device.

Further preferably, the driven unit of this electronic device is a time information display unit that displays time information kept by a timekeeping unit.

Because the time information display unit such as the hands of the timepiece is driven by a piezoelectric drive device, this aspect of the invention prevents driving the hands from being affected by magnetic fields, and enables driving the hands of the time information display unit with low power.

The invention thus enables driving a rotating body with low power when using the vibration of a vibrator to drive the rotating body.

Other objects and attainments together with a fuller understanding of the invention will become apparent and appreciated by referring to the following description and claims taken in conjunction with the accompanying drawings.

BRIEF DESCRIPTION OF THE DRAWINGS

Referring now to the attached drawings which form a part of this original disclosure.

DESCRIPTION OF EMBODIMENTS

Figure 1:
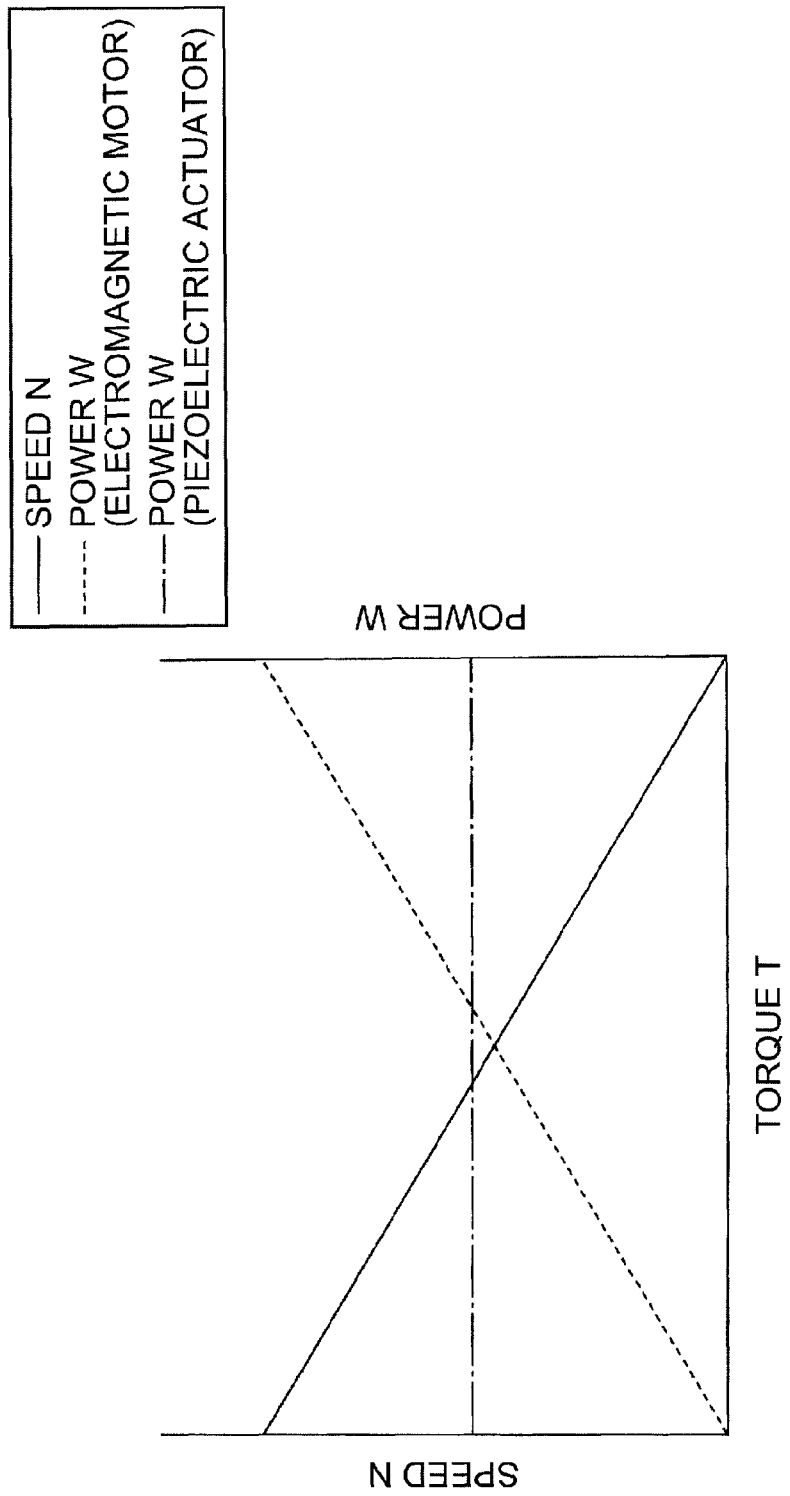
FIG. 1 is a graph showing the relationship between torque and speed and between torque and power in a piezoelectric actuator used in a piezoelectric drive device according to the invention.

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Embodiment 1

A first embodiment of the invention is described next with reference to the accompanying figures.

Note that parts in the second and later embodiments that are the same as or have the same function as parts in the first embodiment are identified by the same reference numerals, and further description thereof is omitted or simplified.

General Configuration

Figure 6:
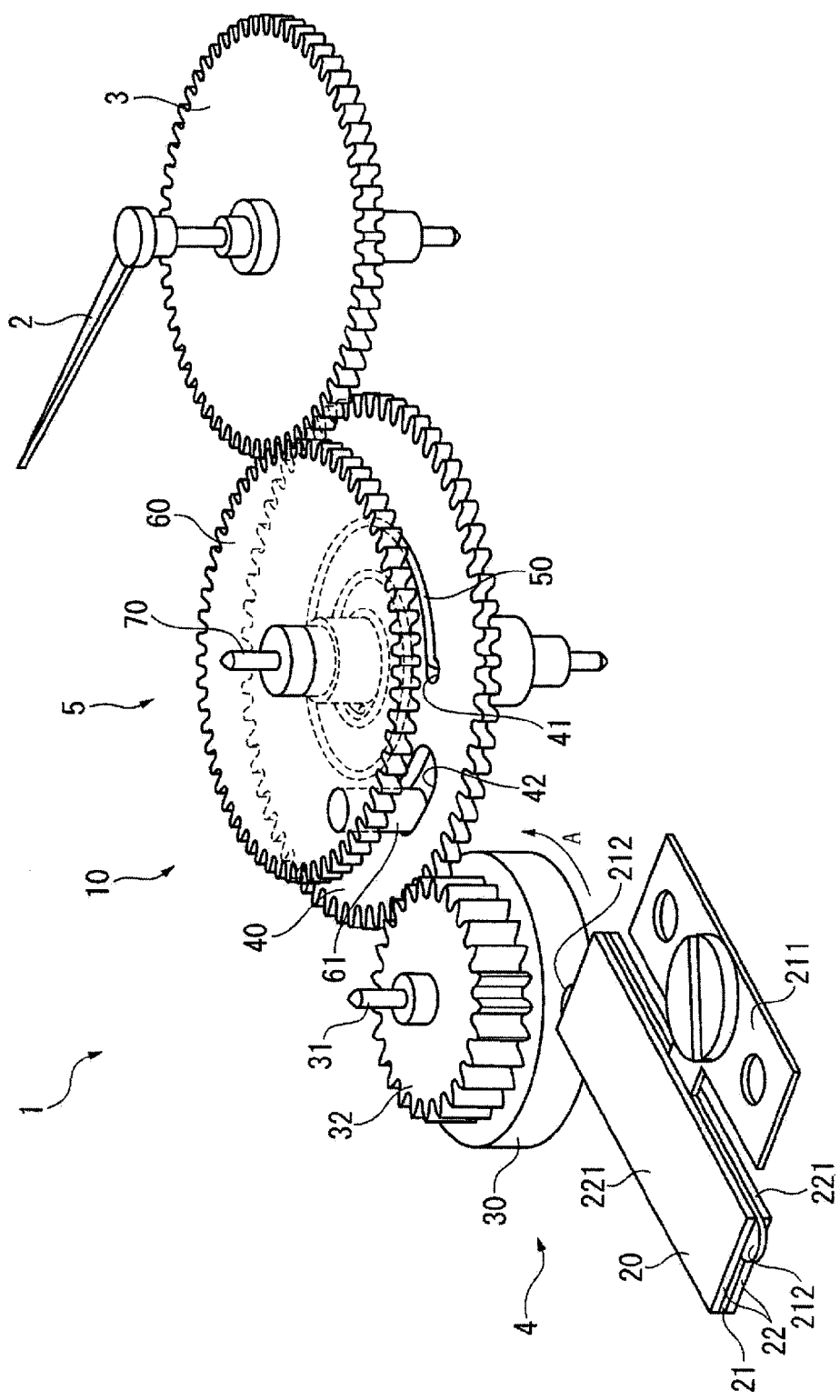
FIG. 6 is an oblique view showing a piezoelectric drive device in a timepiece according to a first embodiment of the invention.
Figure 7:
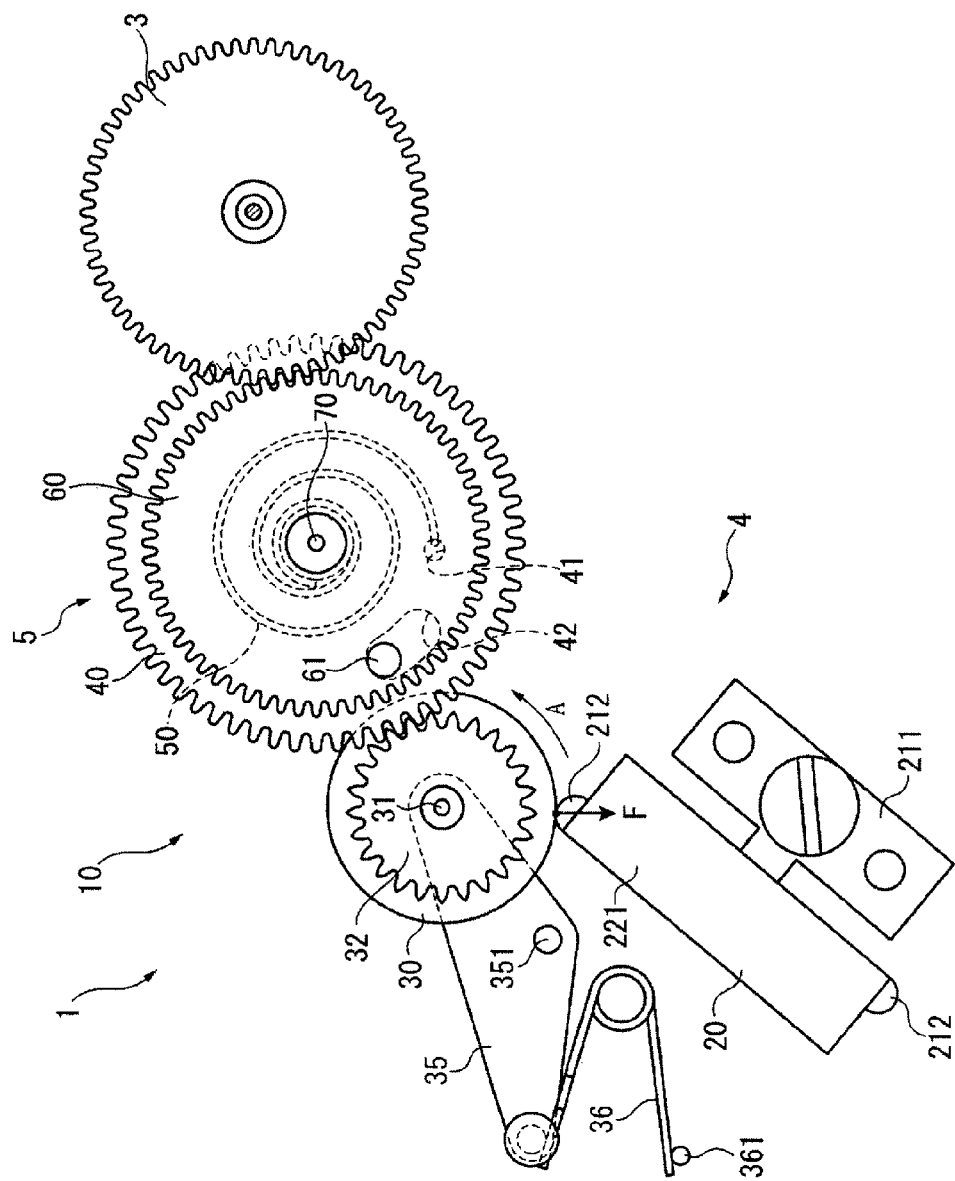
FIG. 7 is a plan view of the piezoelectric drive device in FIG. 6.

FIG. 6 and FIG. 7 are an oblique view and a plan view showing the drive mechanism of a hand 2 in a timepiece (electric device) 1 according to a first embodiment of the invention. The timepiece 1 has a timekeeping unit 200 inside a case member not shown, a time information display unit that displays the time kept by the timekeeping unit 200 by means of the hand 2, and a drive mechanism for the hand 2. The drive mechanism includes mechanisms for driving a plurality of hands, and includes the movement shown in FIG. 8). A piezoelectric drive device 10 is used to operate the drive mechanism of the hand 2. More specifically, the wheel 3 to which the hand 2 is attached as the driven body can be driven rotationally by the piezoelectric drive device 10.

As also shown in FIG. 6 and FIG. 7, the piezoelectric drive device 10 includes a piezoelectric actuator 4 and a rotor transmission wheel 5 (rotor transmission gear). The piezoelectric actuator 4 makes a rotor ring to rotate using the vibration of a piezoelectric element. The rotor transmission wheel 5 transfers while reducing the speed of the rotational drive of the piezoelectric actuator 4 to the wheel 3.

Piezoelectric Actuator

The arrangement of the piezoelectric actuator 4 is described next. The piezoelectric actuator 4 includes a vibrator 20 with a piezoelectric element 22 and a rotor ring (or rotor) 30. The rotor ring 30 is rotated by the vibrator. The characteristics of a piezoelectric actuator 4 used in the present invention are described next with reference to the graphs in FIG. 1 to FIG. 5.

FIG. 1 is a graph showing the relationship between speed and the torque produced by a piezoelectric actuator 4 and a common electromagnetic motor, and between the torque and power. As indicated by the solid line in FIG. 1, the relationship between the torque T produced by a piezoelectric actuator 4 and speed N is the same as the relationship in a common electromagnetic motor, that is, speed N rises as torque T decreases, and speed N falls as torque T rises. Furthermore, while the power W required to drive generally rises with torque T in an electromagnetic motor as denoted by the dotted line in FIG. 1, the power W required by a piezoelectric actuator 4 to drive is substantially constant and is not particularly affected by torque T as indicated by the dot-dash line in FIG. 1. Note that these characteristics are theoretical, and in practice there is some fluctuation.

Figure 2:
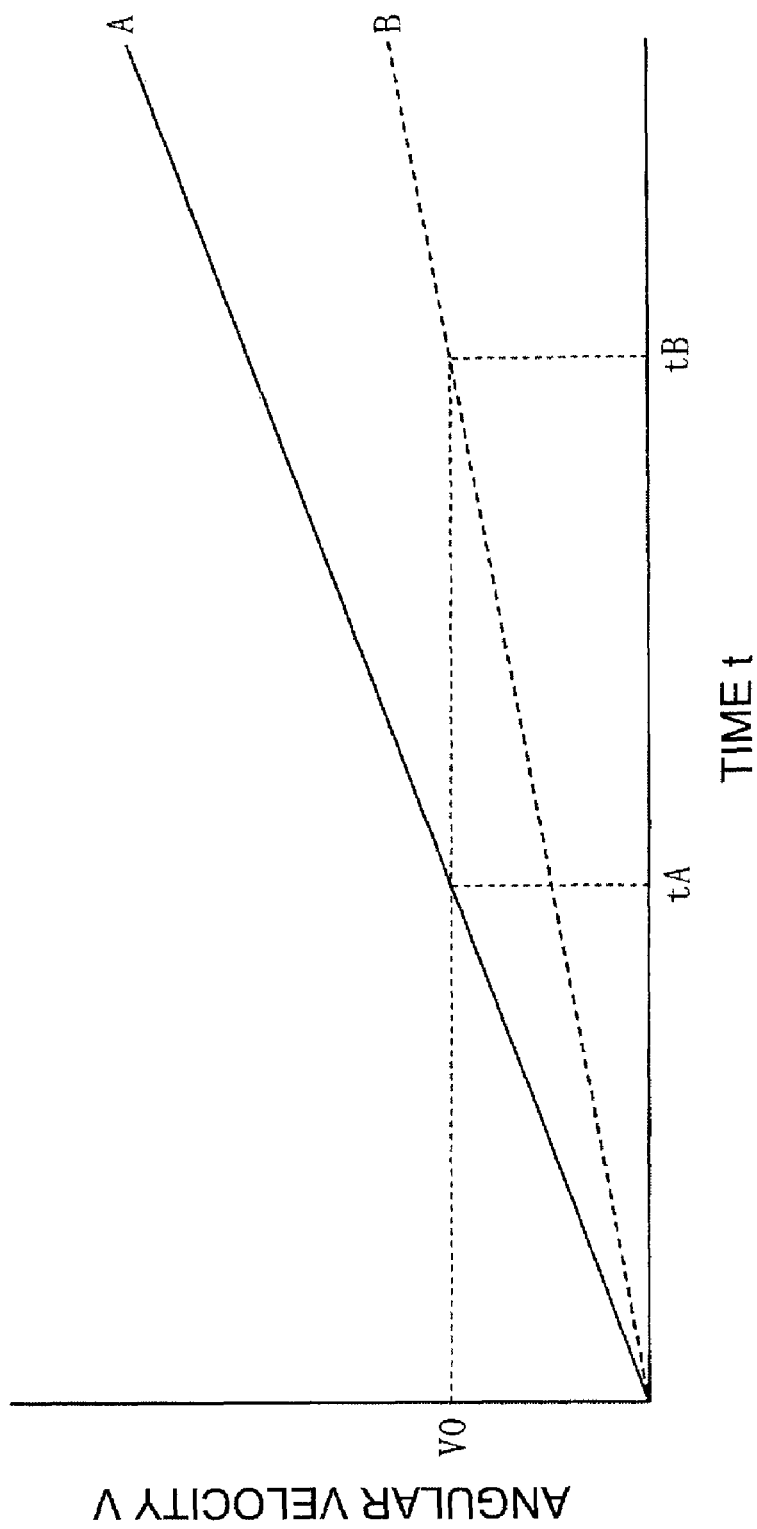
FIG. 2 is a graph showing the relationship between time and angular velocity during rotation of a common solid body.

FIG. 2 is a graph showing the relationship between time t and angular velocity V when a force of moment N acts on a common solid body that rotates on a given axis. The relationship between the moment N of the force acting on the solid body, the angular acceleration $\beta$ produced by this force, and the inertial moment I of the solid body is generally defined by the equation $N=I*\beta$. More specifically, if the moment N of the force is constant, angular acceleration $\beta$ decreases as the moment of inertia I increases. In other words, the greater the moment of inertia I, the longer the time required to reach a specific angular velocity V0. For example, assuming solid bodies A and B having a different moment of inertia I where the relationship between the inertial moments IA and IB is IA:IB=1:2, the relationship between the angular acceleration $\beta$A and $\beta$B of the solid bodies A and B is $\beta$A:$\beta$B=2:1. As shown by the solid line in the graph in FIG. 2, the slope of the solid body A having the lower inertial moment I is steep (the rate of change in angular velocity V is greater), and comparing the time t required to reach a prescribed angular velocity V0, the required time tB of solid body B is 2× the required time tA of solid body A. This shows that solid body B requires twice the time required to move a prescribed distance (prescribed angle of rotation) as solid body A.

The invention seeks an effect based on these characteristics of a solid body that are affected by the moment of inertia I, and these effects are further described below.

Figure 3:
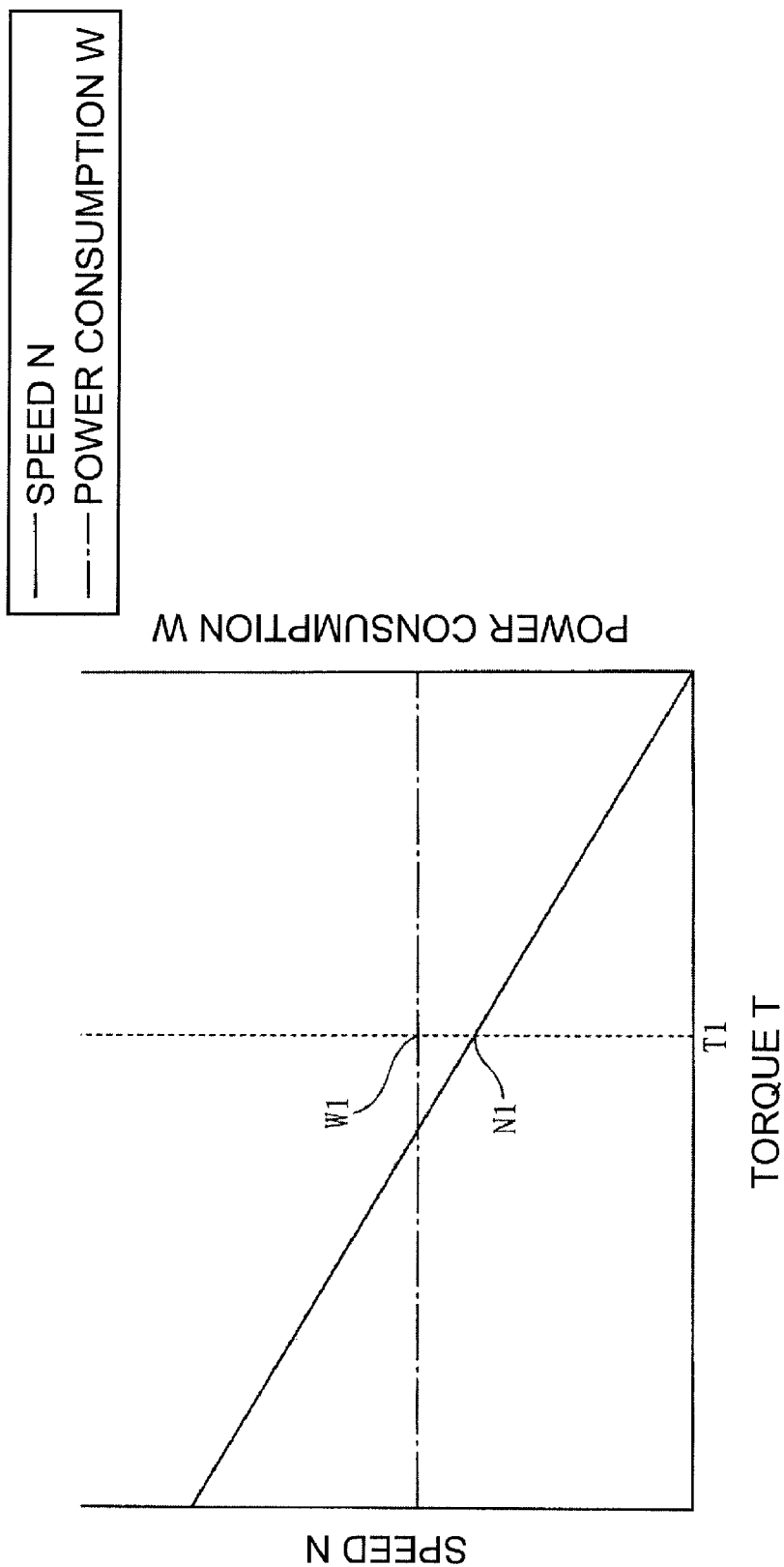
FIG. 3 is a graph showing the relationship between torque and speed and between torque and power consumption in the piezoelectric actuator.
Figure 4:
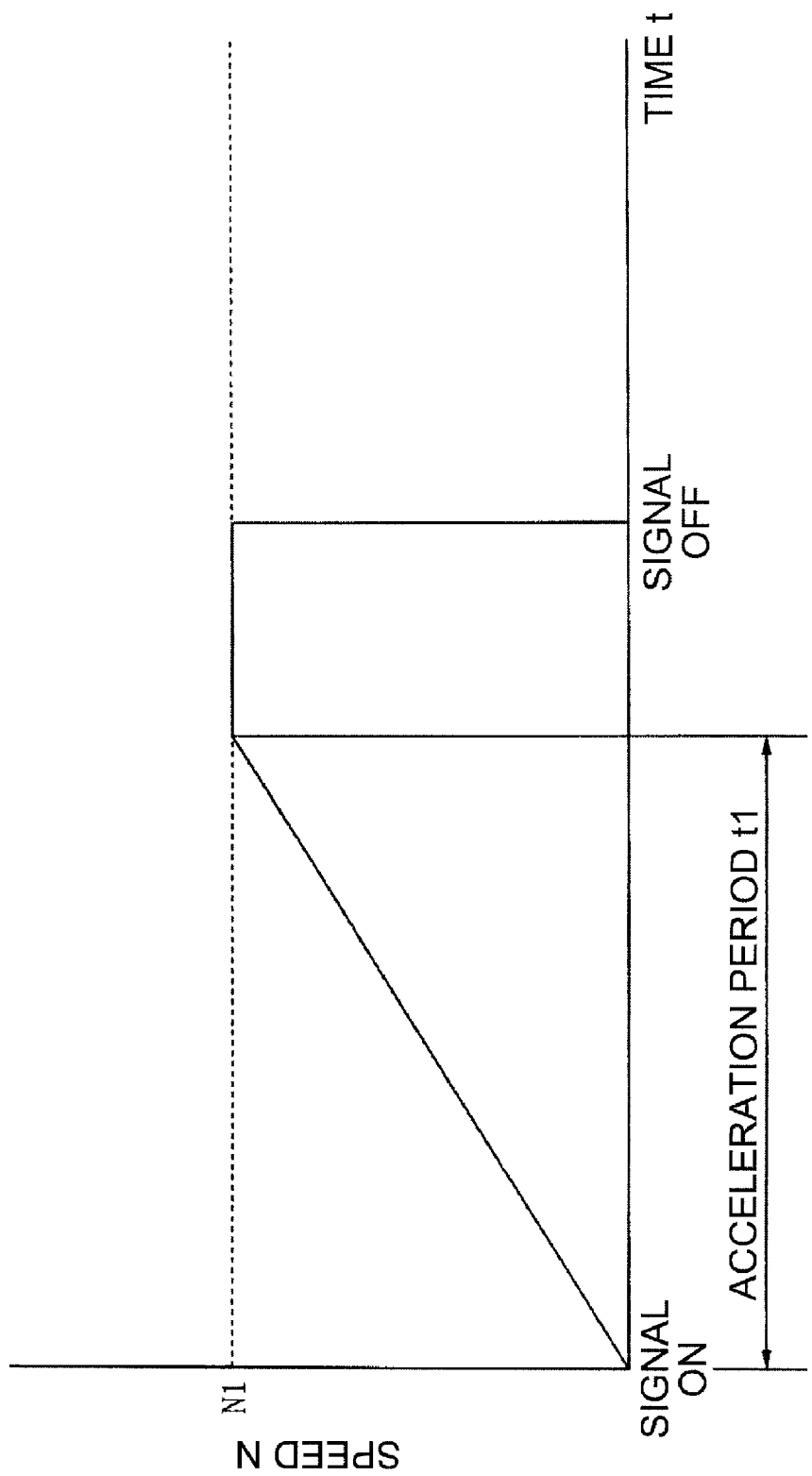
FIG. 4 is a graph showing the relationship between time and speed when the piezoelectric actuator starts.

The basic performance of a piezoelectric actuator 4 according to the present invention is derived from the speed N1 and power consumption W1 when a certain torque (load torque) T1 is produced as shown in FIG. 3. The relationship between time t and speed N when the piezoelectric actuator 4 starts from a dead stop is shown in FIG. 4. The speed N starts to accelerate after a drive signal is applied to the piezoelectric element 22 of the piezoelectric actuator 4 (signal ON), and drive signal supply stops (signal OFF) after a prescribed speed N1 is reached. The time (acceleration time) t1 required to reach speed N1 varies according to moment of inertia I.

For example, when a speed reducing wheel train for slowing the speed N of a rotor is disposed between the rotor and hands 2 of a timepiece, the inertial moment of the speed reducing wheel train and the hands 2 is relatively great compared with the inertial moment of the rotor, and the combined inertial moment of the rotor, speed reducing wheel train, and hands 2 is ten to one-hundred times larger than the inertial moment of the rotor alone.

The combined inertial moment of the rotor, speed reducing wheel train, and hands 2 is determined by the arrangement and form of the wheel train and hands 2, for example, the acceleration time t1 of the rotor increases as the moment of inertia rises, the drive signal must therefore be applied to the vibrator 20 longer, and power consumption by the piezoelectric drive device 10 increases.

Because the invention disposes an elastic device (spiral spring 50, for example) on the driven body side of the rotor, a driven body or rotating target object with a relatively large inertial moment is not driven directly by the piezoelectric actuator 4 when the piezoelectric actuator 4 is started from a dead stop, and the inertial moment of the part that is directly rotated by the piezoelectric actuator 4 is decreased by the inertial moment of the driven body or the rotating target object.

More specifically, elastic deformation of the elastic device starts simultaneously to rotation of the rotor, and the rotational energy of the rotor is stored as elastic energy by the elastic device. When the stored elastic energy reaches a prescribed amount and a prescribing timing point is reached, the driven body and the rotating target object start rotating. The inertial moment of the driven body and rotating target object is thus prevented from acting on the rotor until the rotor reaches a prescribed speed at a prescribed time. Because the inertial moment I acting on the piezoelectric actuator 4 can thus be reduced, the rotor acceleration time t1 can be shortened as shown in FIG. 4, and the piezoelectric actuator 4 can increase the speed N of the rotor to a prescribed speed N1 in a short time when starting. Because the piezoelectric actuator 4 drive time required to rotate the rotating target object a prescribed angle can thus be shortened, the time the drive signal is applied can also be shortened, starting performance is improved, and the rotating target object can be driven with little power.

Furthermore, because the driven body and rotating target object can be rotated for a longer time than the rotor rotation time by means of the stored elastic energy if the rotor is rotated a prescribed angle in order to drive the rotating target object a specific angle of rotation, the driven body can be caused to rotate the prescribed angle of rotation even if the piezoelectric actuator 4 is stopped once the rotor is driven the prescribed angle.

By providing an elastic device as described above, the invention eliminates the effect of the inertial moment of the driven body and rotating target object located downstream from the elastic device relative to the rotor, and improves starting performance. On the other hand, the elastic energy of the elastic device is also applied to the resting rotor, and this force applied by the elastic device exerts a new load on the starting performance of the rotor. However, as described below, the effect of this force applied by the elastic energy of the elastic device on the rotational starting performance of the rotor is small.

More specifically, both dynamic loads and static loads act on the piezoelectric actuator 4. Which of these loads has the operational effect of shortening the piezoelectric actuator drive time and drive signal supply time, improving starting performance, and enabling driving with low power consumption is considered next.

In an environment in which acceleration from noise, for example, also works, dynamic loads result from the inertial moment of the driven object, and static loads are produced by friction from the driven object, air resistance, and the reaction of the elastic device in the present invention.

The effect of dynamic loads is greater than the effect of static loads on a piezoelectric actuator. More particularly, when the piezoelectric actuator 4 drives the driven object forcefully in a short time (such as when instantaneously driving a hand 2 one step), the effect of the moment of inertia is great and the effect of the static load from the elastic device, for example, is small. This was verified by the present inventors in experiments.

Therefore, by using the elastic device to isolate the piezoelectric actuator 4 from the effect of the moment of inertia of parts downstream from the elastic device, the present invention achieves the foregoing operational effect whereas an arrangement that does not use the elastic device of the invention cannot.

The effect of the load of the elastic device on the characteristics of the piezoelectric actuator 4 is described next with reference to FIG. 5.

Figure 5:
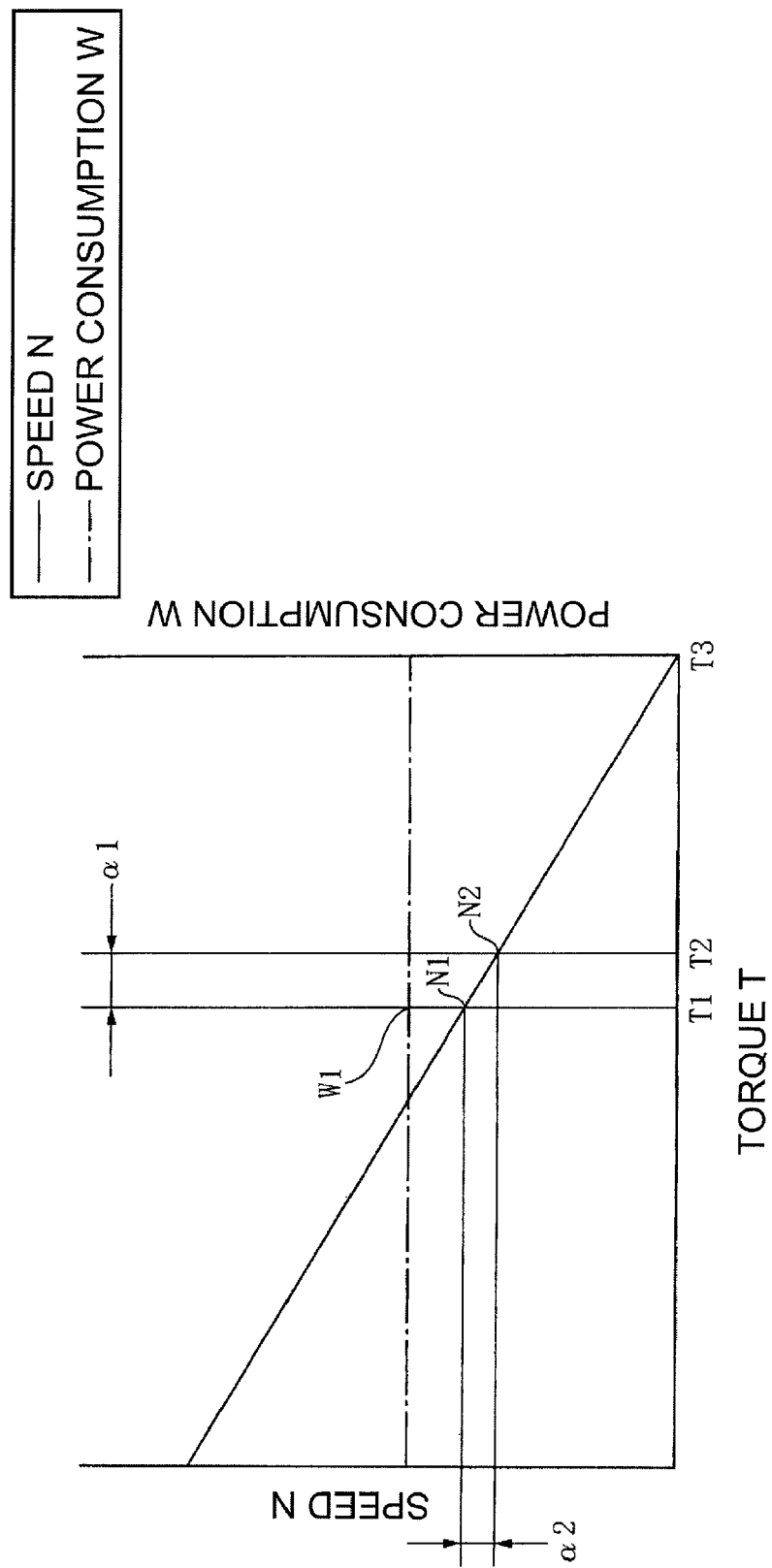
FIG. 5 is a graph showing the relationship between torque and speed and between torque and power consumption in the piezoelectric actuator.

FIG. 5 shows the drop in the speed N of the piezoelectric actuator 4 when the torque T applied to the piezoelectric actuator 4 increases. The load torque T2 when the piezoelectric actuator 4 is subject to the load from the elastic device must exceed load torque T1 by at least a minimum amount. This load torque T2 is the torque required to drive the driven body (such as the wheel train and hand 2) that is rotated by the elastic energy stored in the elastic device. This load torque T2 exceeds load torque T1 by $\alpha 1$. The speed at load torque T2 is N2. The drop in speed N when the speed drops from N1 to N2 is $\alpha 2$. Because the speed drops $\alpha 2$ when the torque rises $\alpha 1$, the basic performance of the piezoelectric actuator 4 drops. However, this relationship between torque T and speed N is the relationship when the piezoelectric actuator 4 is driving in a stable state.

However, the present invention seeks to reduce the power consumption of the total drive cycle from start to stop by reducing energy loss when starting a piezoelectric actuator 4 from a dead stop, particularly when rapidly starting the piezoelectric actuator, and this requires comparing the reduction in basic performance resulting from the drop $\alpha 2$ in speed with the reduction in energy loss when starting and determining which affords the desired operational effect.

The load torque T2 when using an elastic device is described next using driving a timepiece hand 2 by way of example. Load torque T2 is preferably greater than load torque T1 the increase $\alpha 1$ in the load torque is extremely small. However, a load increase corresponding to the deflection of the elastic device that drives one step is required by the invention in a piezoelectric actuator 4 that drives at a prescribed interval (that is, drives in steps). If this increase in the load is substantially zero, the load of the elastic device on the piezoelectric actuator 4 is extremely low.

For example, if the angle of rotor rotation in one step is 20° and the angle of rotation corresponding to the initial deflection of the elastic device is 20°, deflection of the elastic device increases to a deflection of 40°, and the load imposed by the elastic device is twice the initial load. In other words, if the initial deflection can be increased, the increase in the load becomes smaller. If a hairspring, for example, is used as the elastic device and the number of windings at initial deflection is three, the increase in the load when the rotor rotates 20° is $(20°\div(360°\times 3 \text{ winds}))=0.018$ or less than 2%. The increase in the load from the elastic device can therefore be held to a very small amount, and the effect on the piezoelectric actuator 4 performance can be substantially eliminated.

When an elastic device is not used, the required piezoelectric actuator 4 performance must be set with consideration for the effect of the shape of the rotating target object, external impact, and the temperature environment.

As shown in FIG. 5, while load torque T2 is set for the piezoelectric actuator 4 to drive a load under normal drive conditions, maximum torque T3 is set with an allowance for momentary loads. For example, when a rotating target object with an unbalanced shape (such as a timepiece hand 2 or other cantilevered member) is included in the drive path, the effect of the inertial moment on the piezoelectric actuator 4 will be momentarily great depending on the orientation of the rotating target object. For example, if the piezoelectric drive device 10 is used worn on the wrist, acceleration G from the movement of the arm or light impact may also act on the rotating target object. This acceleration G can be several times the load in a static state particularly if the rotating target object has an unbalanced shape, and acceleration G of several ten to several hundred times the static load can occur when the user claps his hands, for example. In order to cause the rotating target object to rotate under such momentary loads or when the moment of inertia is temporarily high when the piezoelectric actuator 4 directly drives the driven body as in the prior art, the maximum output torque T3 of the piezoelectric actuator 4 must be set to produce enough torque to overcome these loads.

However, when an elastic device is used as disclosed by the present invention, elastic deformation of the elastic device can reduce the effect on the piezoelectric actuator 4 of temporarily high inertial moments and sudden acceleration G. More specifically, even if rotation of the driven body stops temporarily as a result of sudden acceleration G being applied in the direction impeding rotation of the driven body, the rotor can continue rotating while rotation of the driven body is stopped, and the rotational energy of the rotor is stored as elastic energy by the elastic device. Once this sudden acceleration G is gone, the stored elastic energy can cause the driven body to rotate. Furthermore, when sudden acceleration G occurs intermittently such as when clapping, the driven body can be rotated by the stored elastic energy in the intervals when this sudden acceleration G does not occur.

Using the elastic device of the invention thus eliminates the prior art need to design the piezoelectric actuator 4 to accommodate sudden acceleration G, enables designing the piezoelectric actuator 4 to operate based on the static load T1 (set to T2), enables reducing the power supplied to the piezoelectric actuator, and enables reducing power consumption W1.

Furthermore, if the viscosity of lubricant used in the bearing parts is also considered, the performance of the piezoelectric actuator 4 must also be improved to account for any increase in viscosity because the viscosity of lubricating oil increases as the temperature drops, and viscosity increases proportionally to the speed of the driven body. However, if the elastic device of the invention is used to gradually rotate the driven body by means of elastic energy, the effect of the viscosity of the lubricating oil on the driven body can be reduced.

The vibrator 20 has a thin laminated structure including a substantially rectangular, thin reinforcing member 21, and substantially rectangular piezoelectric elements 22 that are bonded to the opposite sides of the reinforcing member 21.

An arm part 211 is projecting to one side from approximately the middle of the length of the reinforcing member 21, and this arm part 211 is fastened by, for example, a screw to the main plate not shown. An approximately semicircular contact unit 212 is formed projecting longitudinally from the reinforcing member 21 at diagonally opposite end parts of the thin reinforcing member 21. One of the contact units 212 contacts the side of the rotor ring 30.

The reinforcing member 21 and rotor ring 30 are made from stainless steel (SUS), for example. Utilizing the reinforcing member 21 and rotor ring 30 from stainless steel, hardened beryllium copper, or other non-magnetic material improves the magnetic resistance of the piezoelectric actuator 4 and enables the driving without being affected by magnetic fields.

The piezoelectric elements 22 can be made from a variety of materials including lead zirconate titanate (PZT(R)), quartz, lithium niobate, barium titanate, lead titanate, lead metaniobate, polyvinylidene fluoride, lead zinc niobate, and lead scandium niobate, for example.

A drive electrode 221 is formed on both sides of the piezoelectric elements 22 by a plating layer not shown.

Applying voltage of a specific frequency to the drive electrode 221 of this vibrator 20 excites vibration in a longitudinal primary vibration mode in which the piezoelectric elements 22 expand and contract longitudinally. Because the contact units 212 are disposed to diagonally opposite ends of the vibrator 20, the weight of the vibrator 20 is not balanced relative to the longitudinal center line. This weight imbalance makes the vibrator 20 to also vibrate in a sinusoidal secondary vibration mode bending substantially perpendicularly to the longitudinal axis. The vibrator 20 thus excites vibration combining this longitudinal primary vibration mode and this sinusoidal secondary vibration mode, and the contact units 212 vibrate on a substantially elliptical path.

The rotor ring 30 is driven rotationally by the vibrator 20. A rotor pinion 32 for transferring the rotation to a first rotor transmission wheel 40 is affixed to the rotor axle 31 of the rotor ring 30. The rotor axle 31 is supported rotatably on one end of a support arm 35. The support arm 35 is supported on the main plate, for example, to pivot freely around a pivot pin 351. The other end of the support arm 35 is urged by a spring 36 as a pressure means.

The spring 36 is disposed to push the rotor ring 30 and the contact unit 212 of the vibrator 20 together.

More specifically, the spring 36 is a torsion spring of which one end (first end) is attached to the main plate, for example, by a support member 361. The other end (second end) of the spring 36 urges an end part of the support arm 35 so that the rotor ring 30 is urged toward the vibrator 20 and pushed in pressure direction F to the contact unit 212. This pressure direction F is substantially perpendicular to the axis of rotation of the rotor ring 30, and pressure direction F and the vibration direction of the vibrator 20 are coplanar. This produces appropriate friction between the contact unit 212 and the rotor ring 30 so that the transmission efficiency of vibrator 20 drive power is good.

When the contact unit 212 of the vibrator 20 vibrates on a substantially elliptical path, the contact unit 212 pushes the rotor ring 30 during only part of this vibration path, and the rotor ring 30 and rotor pinion 32 are rotationally driven counterclockwise only (in the direction of arrow A). The rotor ring 30 and rotor pinion 32 in this embodiment of the invention thus constitute the rotor of the present invention.

Rotor Transmission Wheel

The rotor transmission wheel 5 is described next. The rotor transmission wheel 5 includes a first rotor transmission wheel 40 that engages the rotor pinion 32, a spiral spring 50 of which one end engages the first rotor transmission wheel 40, a second rotor transmission wheel 60 connected to the other end of the spiral spring 50, and a transmission wheel axle 70.

The first rotor transmission wheel 40 is disc shaped with a larger diameter than the rotor pinion 32, and is supported rotatably by the transmission wheel axle 70. A spring engaging hole 41 and a positioning hole 42 are formed passing in the axial direction through the first rotor transmission wheel 40. An optical detection means not shown for detecting rotation of the first rotor transmission wheel 40 is also provided. This non-contact detection means stops the piezoelectric actuator 4 each time the first rotor transmission wheel 40 is rotated a prescribed distance by the piezoelectric actuator 4, and then starts the piezoelectric actuator 4 after a prescribed time. The piezoelectric actuator 4 is thus driven periodically by repeatedly starting and stopping the piezoelectric actuator 4.

When the piezoelectric actuator 4 stops, the contact unit 212 of the piezoelectric actuator 4 is pressed to and frictionally engaged with the rotor ring 30 by the spring 36, and the rotor ring 30 is thus held in that position. The rotor ring 30 thus does not move in the direction of rotation. The first rotor transmission wheel 40 is therefore also positioned in the direction of rotation by the positioned rotor ring 30. The positions of the second rotor transmission wheel 60 and the wheel 3 in the direction of rotation are thus determined by the positioning hole 42 and positioning pin 61, and the position of the hand 2 is set to a specific position. Note that the positioning hole 42 and positioning pin 61 constitute a release limiting unit as further described below.

The positioning hole 42 is an elongated hole formed along the outside circumference of the first rotor transmission wheel 40. The length of the open part of the positioning hole 42 along the outside circumference of the first rotor transmission wheel 40 is set so that when the second rotor transmission wheel 60 stops the first rotor transmission wheel 40 can rotate forward (clockwise as seen in FIG. 7) the distance driven in one period of the piezoelectric actuator (the amount of looseness).

The second rotor transmission wheel 60 is affixed to the transmission wheel axle 70, has the same axis of rotation as the first rotor transmission wheel 40, and engages the wheel 3. A cylindrical positioning pin 61 is affixed to the second rotor transmission wheel 60 projecting toward the first rotor transmission wheel 40 and passing through the positioning hole 42.

The spiral spring 50 is formed by winding spring wire that is circular in section in a clockwise spiral as seen in plan view in FIG. 7. The outside circumference end of the spiral spring 50 is held in the spring engaging hole 41, and the inside circumference end is fixed and wound to the transmission wheel axle 70.

When the first rotor transmission wheel 40 rotates clockwise more than second rotor transmission wheel 60, the spiral spring 50 is elastically deformed in the direction increasing the number of winds, and can store the drive power transferred to the first rotor transmission wheel 40 as elastic energy.

When the spiral spring 50 is held in the initial elastic deformation state is described next.

When the spiral spring 50 is in the initial elastic deformation state (wound approximately three times), the inside end of the spiral spring 50 is fixed to the transmission wheel axle 70 and the outside end of the spiral spring 50 is engaged with the spring engaging hole 41.

When the first rotor transmission wheel 40 and second rotor transmission wheel 60 are then assembled as shown in FIG. 6 with the spiral spring 50 held in this initial elastic deformation state, the elastic energy of the spiral spring 50 exerts a force causing the second rotor transmission wheel 60 to rotate forward (clockwise as seen in FIG. 7) relative to the first rotor transmission wheel 40. Because the positioning pin 61 is held in the positioning hole 42, however, the second rotor transmission wheel 60 is held relative to the first rotor transmission wheel 40 with the positioning pin 61 touching the inside end of the positioning hole 42 in the forward rotation direction as shown in FIG. 7.

The first rotor transmission wheel 40 is also meshed with the rotor pinion 32. The rotor ring 30 disposed in unison with the rotor pinion 32 is positioned in contact with the contact unit 212 of the piezoelectric actuator 4 by elastic pressure as described above. As a result, when the piezoelectric actuator 4 is stopped the rotor ring 30 is also stopped in contact with the contact unit 212 of the piezoelectric actuator 4, and the first rotor transmission wheel 40 meshed with the rotor pinion 32 is also held stopped. The second rotor transmission wheel 60 is also positioned relative to the first rotor transmission wheel 40 with the positioning pin 61 in contact with the end of the positioning hole 42. The spiral spring 50 thus remains in the same elastic deformation state (initial elastic deformation state).

The spiral spring 50 is an elastic device, the second rotor transmission wheel 60 is a driven body, and the positioning pin 61 and positioning hole 42 render a release limiting unit in this embodiment of the invention.

The positioning hole 42 and positioning pin 61 constituting the release limiting unit thus hold the elastic deformation (initial deflection) of the spiral spring 50 in the initial state as described above, but also function to hold the second rotor transmission wheel 60 and wheel 3 in a prescribed position when the piezoelectric actuator 4 drives one step (one cycle).

More specifically, when the piezoelectric actuator 4 drives one step, the first rotor transmission wheel 40 rotates the distance of one drive cycle (one step) clockwise as seen in FIG. 7 and the spiral spring 50 is simultaneously wound. The unwinding force of the spiral spring 50 then rotationally drives the second rotor transmission wheel 60 clockwise, but because the positioning pin 61 is pushed against the inside clockwise end of the positioning hole 42 (the inside surface the positioning pin 61 is touching in FIG. 6 and FIG. 7), the second rotor transmission wheel 60 is positioned in the direction of rotation.

The vibrator 20 of the piezoelectric actuator 4 is fixed by the arm part 211 to the main plate as the frame of the timepiece 1. One end of the rotor axle 31, the transmission wheel axle 70, and the axle of the wheel 3 is held in a bearing hole in the main plate, and the other end of each axle is held by a bearing in a wheel train bridge disposed opposite the main plate. Note that one end of the wheel 3 axle and the axles of the other hand wheels is supported by the main plate but the other ends can be supported by a bridge other than the wheel train bridge.

Timepiece Circuits

Figure 8:
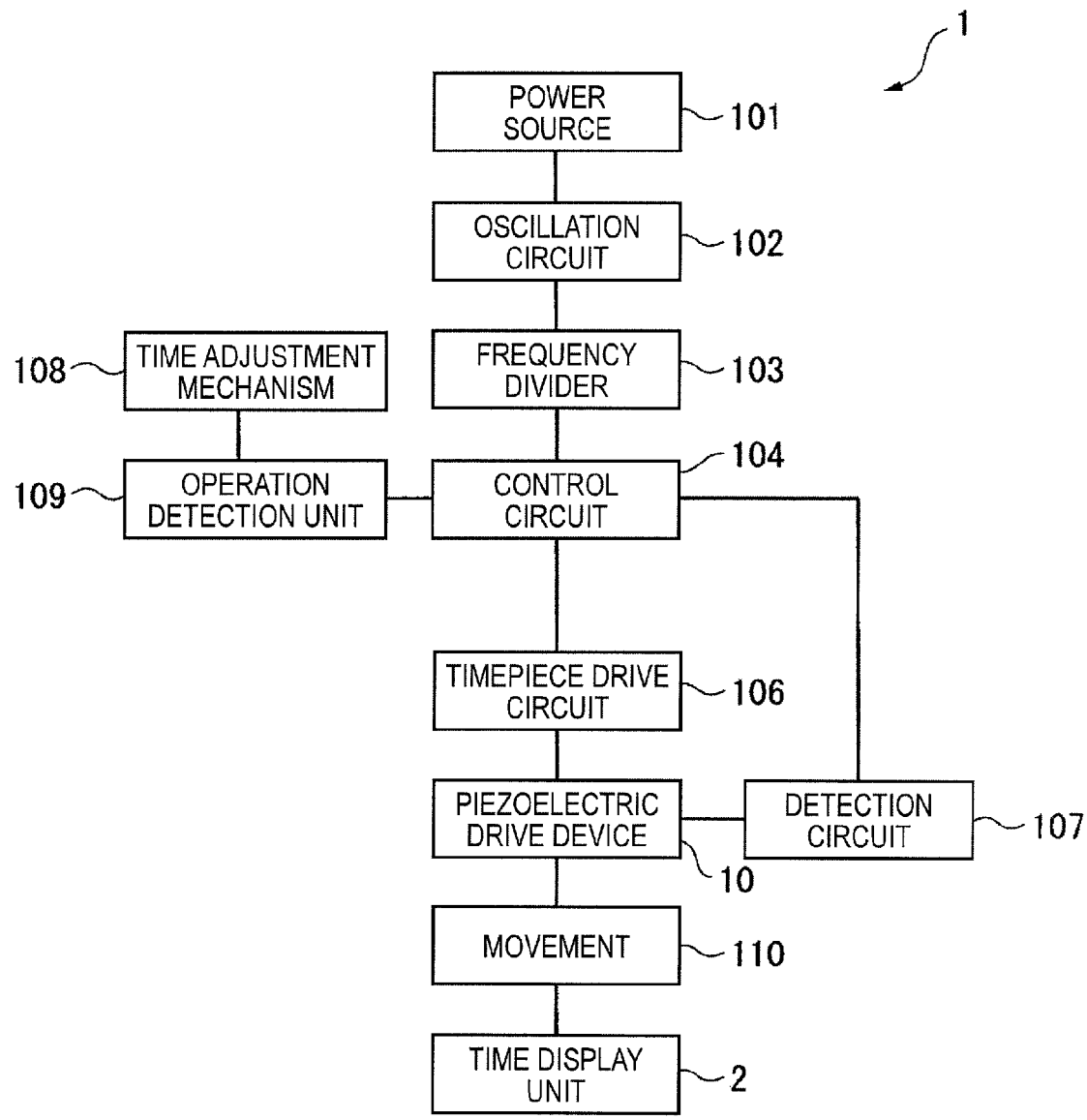
FIG. 8 is a block diagram showing the circuits in a timepiece according to the first embodiment of the invention.

The circuits of the timepiece 1 are described next with reference to FIG. 8.

The drive circuit of the timepiece 1 includes a control circuit 104, a frequency divider 103, and an oscillation circuit 102 driven by a power source 101 such as a primary battery or secondary battery.

The oscillation circuit 102 has a reference vibration source such as a crystal oscillator, and outputs a vibration signal to the frequency divider 103.

Based on the vibration signal input from the oscillation circuit 102, the frequency divider 103 outputs a time reference signal such as a 1-Hz signal.

The control circuit 104 counts the time based on the reference signal output from the frequency divider 103, and controls the timepiece drive circuit 106 to output a timepiece drive signal according to the timepiece specifications.

For example, if the timepiece 1 has hour, minute, and second hands and moves the hands one step each second, the control circuit 104 tells the timepiece drive circuit 106 to output the timepiece drive signal once a second.

If the timepiece 1 has only two hands, an hour hand and minute hand, and the minute hand is advanced 2° every twenty seconds, the control circuit 104 tells the timepiece drive circuit 106 to output the timepiece drive signal once every twenty seconds.

The control circuit 104 is connected to a detection circuit 107 (detection means), and controls operation of the timepiece drive circuit 106 when triggered by the detection signal output from the detection circuit 107.

The detection circuit 107 detects if the rotor (rotor ring 30 and rotor pinion 32) has rotated a prescribed distance (angle of rotation), and outputs the detection signal to the control circuit 104. The detection circuit 107 can use any type of sensor that can detect rotor rotation (angle of rotation), including optical sensors using an LED, mechanical contacts using a spring, and magnetic sensors, for example.

The detection circuit 107 is not limited to sensors that directly detect rotor movement, and could indirectly detect movement of the rotor ring 30 by detecting movement (the angle of rotation) of the first rotor transmission wheel 40, which moves in direct correlation to the rotor. More specifically, the detection circuit 107 can detect movement of a member that is disposed between the rotor and the spiral spring 50 and rotates in conjunction with the rotor.

This embodiment of the invention uses an optical detection circuit 107 (detection means) that detects rotation of the first rotor transmission wheel 40 as described above.

When the detection signal is output from the detection circuit 107, that is, the detection circuit 107 detects that the rotor has rotated a prescribed distance, the control circuit 104 controls the timepiece drive circuit 106 to stop outputting the drive signal, that is, stops the piezoelectric drive device 10.

For example, if a second hand moves one step every second, the control circuit 104 instructs the timepiece drive circuit 106 to output the drive signal each second. The detection circuit 107 is set in this case to detect when the rotor rotates the prescribed angle corresponding to the second hand advancing one second, that is, 6°. When the detection circuit 107 detects that the rotor has rotated this prescribed angle, the control circuit 104 makes the timepiece drive circuit 106 to stop outputting the drive signal. The piezoelectric drive device 10 thus drives the second hand to advance one second at a 1-second interval.

If the timepiece has two hands and the minute hand is advanced 2° every 20 seconds, the control circuit 104 controls the timepiece drive circuit 106 to output the drive signal every 20 seconds. The detection circuit 107 is set in this case to detect when the rotor rotates the prescribed angle corresponding to the minute hand advancing 20 seconds, that is, 2°.

When the detection circuit 107 detects that the rotor has rotated this prescribed angle, the control circuit 104 makes the timepiece drive circuit 106 to stop outputting the drive signal.

An operation detection unit 109 that detects operation of a time adjustment mechanism 108, such as a crown or button, is also connected to the control circuit 104. When the operation detection unit 109 detects a prescribed operation of the time adjustment mechanism 108, the operation detection unit 109 outputs a specific signal to the control circuit 104. Based on the signal from the operation detection unit 109, the control circuit 104 controls the timepiece drive circuit 106 to output the drive signal, that is, to start driving the piezoelectric drive device 10, or to stop drive signal output, that is, to stop driving the piezoelectric drive device 10.

If the crown is pulled out to set the time, for example, movement of the hands must be stopped. As a result, if the operation detection unit 109 outputs a detection signal indicating that the crown was pulled out, the control circuit 104 outputs a control signal to stop driving the piezoelectric drive device 10 to the timepiece drive circuit 106. On the other hand, if the operation detection unit 109 outputs a detection signal indicating that the crown was pushed in, the control circuit 104 outputs a control signal to start driving the piezoelectric drive device 10 to the timepiece drive circuit 106.

The timepiece drive circuit 106 outputs the piezoelectric drive device 10 drive signal when a control signal is received from the control circuit 104. More specifically, the timepiece drive circuit 106 applies an AC signal (pulse signal) to apply a drive voltage of a specific frequency to drive the piezoelectric elements 22 of the piezoelectric drive device 10.

The method of controlling the drive frequency of the piezoelectric drive device 10 is not particularly limited. As disclosed in Japanese Laid-Open Patent Publication JP-2006-20445-A, for example, the frequency of the drive signal supplied to the piezoelectric elements 22 could sweep (vary) through a wide range including the drivable frequency range to reliably drive the piezoelectric drive device 10. Alternatively, as disclosed in Japanese Laid-Open Patent Publication JP-2006-33912-A, the drive signal frequency can be varied so that the phase difference between the frequency of the drive signal supplied to the piezoelectric elements 22 and the detection signal acquired from the vibration state of the piezoelectric elements 22 goes to a specific target phase difference suitable for driving. Further alternatively, the piezoelectric elements 22 could be driven at a fixed frequency preset for different temperature levels.

The drive signal frequency can further alternatively be controlled by providing a detection electrode to which voltage is not applied to the piezoelectric elements 22 of the piezoelectric drive device 10, and feeding the detection signal output from this detection electrode to the control circuit 104. This detection signal enables the control circuit 104 to confirm the drive state of the piezoelectric drive device 10 and feedback control the drive signal frequency.

The movement 110 has a wheel train that is driven by the piezoelectric drive device 10 (piezoelectric actuator 4 and rotor transmission wheel 5), and includes the wheel 3 in this embodiment of the invention.

The movement 110 converts an amount of movement acquired from the piezoelectric drive device 10 to the movement corresponding to the displayed time, and transfers this movement to the time display unit (hand) 2 (time information display unit). The movement 110 in this embodiment of the invention is a speed reducing wheel train, and therefore converts the movement of the piezoelectric drive device 10 (rotor rotation) at a specific speed reduction ratio to the movement of the time display. For example, if the hand 2 is a second hand that rotates 6° every second and the speed reduction ratio of the movement 110 is ½, the detection circuit 107 is set to output the detection signal whenever the second rotor transmission wheel 60, that is, the first rotor transmission wheel 40, rotates 12°.

The power source 101, the oscillation circuit 102, the frequency divider 103, the control circuit 104, and the timepiece drive circuit 106 constitute a time keeping unit 200 that keeps time information.

Operation of the Piezoelectric Drive Device when Starting

The starting operation of the piezoelectric drive device 10 is described next.

When the piezoelectric actuator 4 is stopped and the drive voltage is applied to the vibrator 20, rotational energy is transferred from the rotor ring 30 through the rotor pinion 32 to the first rotor transmission wheel 40, causing these rotating bodies (rotor ring 30, rotor pinion 32, and first rotor transmission wheel 40) to start rotating and the spiral spring 50 to start elastically deforming so that the transferred rotational energy is stored as elastic energy in the spiral spring 50. When the rotational energy applied to the second rotor transmission wheel 60 by the elastic energy of the spiral spring 50 reaches a specific level, the second rotor transmission wheel 60, the wheel 3, and the hand 2 start to rotate. The rotational energy of this specific level is the rotational energy equal to the combined load of the inertial moment of the rotating bodies (the second rotor transmission wheel 60, wheel 3, and hand 2) and the bearing load of the rotating bodies.

As a result, when the piezoelectric actuator 4 drives one cycle, the first rotor transmission wheel 40 also drives the distance of one period clockwise as seen in FIG. 7, and the spiral spring 50 is simultaneously wound. The unwinding force of the spiral spring 50 thus rotationally drives the second rotor transmission wheel 60 clockwise, but because the positioning pin 61 is elastically pressed against the inside clockwise end of the positioning hole 42 (the inside surface contacted by the positioning pin 61 as seen in FIG. 6 and FIG. 7), the second rotor transmission wheel 60 and the hand 2 are positioned in the rotational direction.

The piezoelectric drive device 10 thus starts and the hand 2 is rotated.

Effect of the Embodiment

This embodiment of the invention has the following effect.

(1) By using a spiral spring 50, the second rotor transmission wheel 60 starts rotating after the drive force of the piezoelectric actuator 4 is stored as elastic energy in the spiral spring 50 when the piezoelectric actuator 4 starts. The inertial moments of the second rotor transmission wheel 60, the wheel 3, and the hand 2 therefore do not work on the piezoelectric actuator 4 when the piezoelectric actuator 4 drives, the starting load on the piezoelectric actuator 4 is thereby reduced, and the required starting power can be reduced.

The needle-like hands 2 of an analog timepiece have a large inertial moment, and the shape of the hands may vary with the design (model) of the timepiece. The inertial moment imposed by the hands 2 therefore varies in different models of timepieces, and power consumption therefore conventionally also differs. In the case of a battery-powered timepiece, this means that battery life also differs according to the mode.

By providing a spiral spring 50, however, the present invention prevents the inertial moment of the hand 2 from acting on the piezoelectric actuator 4, cancels the effect of change in the inertial moment of the hand 2, enables driving the hand 2 with little power, and prevents variation in the battery life in different models.

Disc-shaped indicators that have a larger moment of inertia than a hand 2 can also be used and the freedom of timepiece design can be improved.

(2) Having a spiral spring 50 reducing the starting load on the piezoelectric actuator 4, the drive speed of the piezoelectric actuator 4 can be increased to the desired speed in a short time, the starting time is thereby shortened, and power consumption can be further reduced.

The reason why power consumption can be reduced by reducing the load on the piezoelectric actuator 4 is described next with reference to FIG. 9 and FIG. 10.

Figure 9:
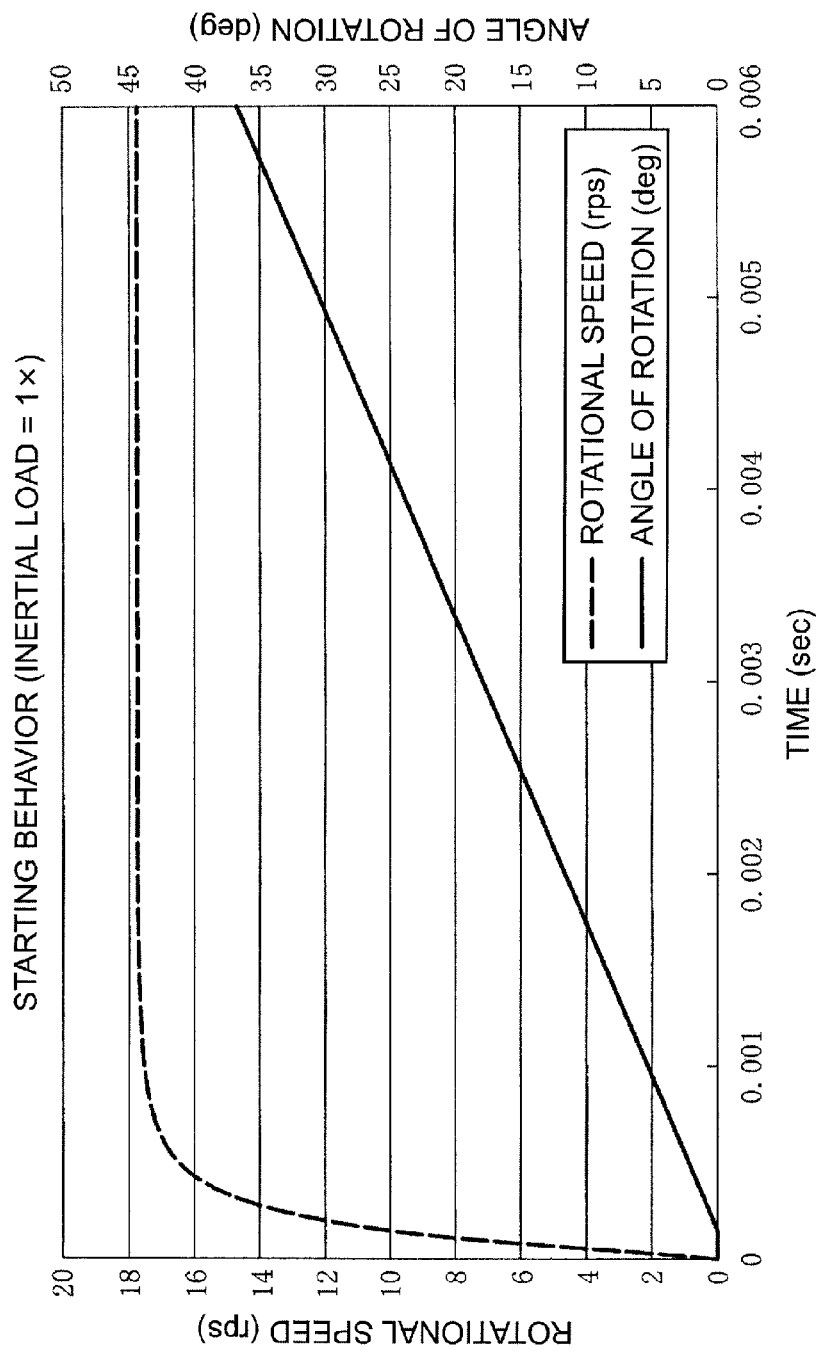
FIG. 9 is a graph showing the relationship between time, rotational speed, and angle of rotation with an inertial load of 1×.
Figure 10:
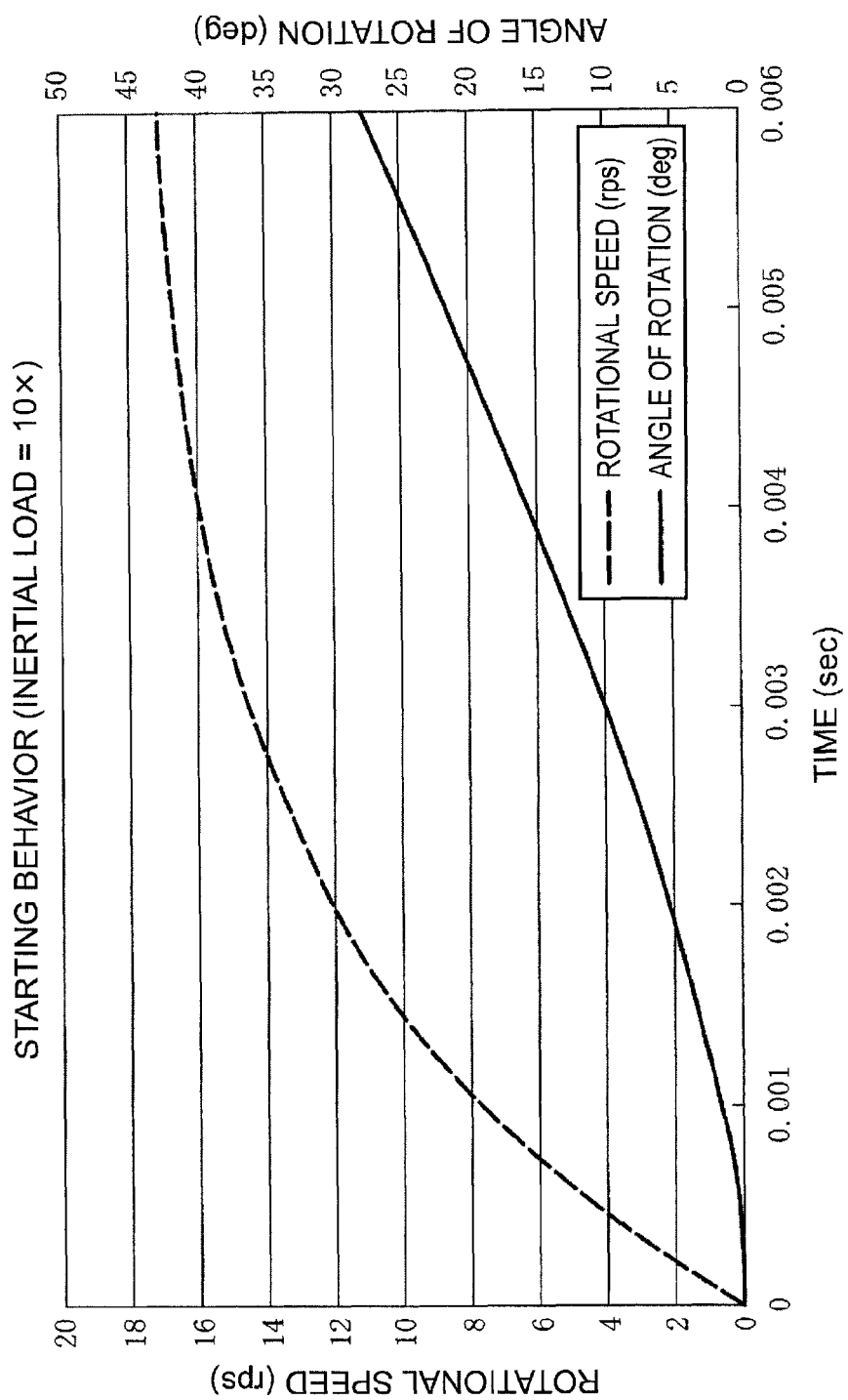
FIG. 10 is a graph showing the relationship between time, rotational speed, and angle of rotation with an inertial load of 10×.

FIG. 9 and FIG. 10 show the relationship between drive time and rotor speed, and between drive time and the angle of rotation of the rotor when the inertial load on the rotor is a prescribed amount (an inertial load of 1× below) and when the inertial load is ten times that amount (a 10× inertial load below).

The speed of rotation gradually increases until it reaches a specific speed when a drive signal is applied to the piezoelectric actuator 4. The increase in the angle of rotation, however, accelerates during the initial increase in speed, and the angle of rotation then increases proportionally to time once the speed becomes constant.

As shown in FIG. 9 and FIG. 10, the rotational speed increases faster and the time needed to move a specific angle of rotation is shorter when the inertial load is lower than higher. In the example shown in FIG. 9 and FIG. 10, it takes approximately 0.0017 second for the rotor to advance 10° with an inertial load of 1×. With an inertial load of 10× as shown in FIG. 10, however, it takes approximately 0.003 second or approximately twice as long as with an inertial load of 1×.

It therefore follows that when the rotor rotates a specific angle, the drive time decreases as the inertial load on the rotor, and therefore the piezoelectric actuator 4, decreases, and power consumption decreases accordingly.

(3) By providing the spiral spring 50, the interference of the spiral spring 50 when an external shock acts on the hand 2, such as when the timepiece is dropped, quickly weakens the affect of the shock, and the drive force of the piezoelectric actuator 4 is stored by the spiral spring 50 while the external shock is working. As a result, when the effect of the shock has disappeared, the elastic energy of the spiral spring 50 can drive rotation of the hand 2. The effect of shock from the hand 2 is therefore not transferred to the piezoelectric actuator 4, and operation of the piezoelectric actuator 4 can be stabilized.

(4) Because the positioning pin 61 and positioning hole 42 hold the initial deflection (initial strain) of the spiral spring 50, swinging of the hand 2, for example, due to external shock can be suppressed by this initial deflection acting constantly on the second rotor transmission wheel 60.

(5) Because the looseness between the positioning pin 61 and positioning hole 42 when the piezoelectric actuator 4 is driven intermittently is set to a range determined by the distance driven in on cycle of the piezoelectric actuator 4, increase in the load on the piezoelectric actuator 4 due to interference between the first rotor transmission wheel 40 and the second rotor transmission wheel 60 can be avoided even if the inertial moment of the hand 2 drive system from the second rotor transmission wheel 60 is relatively large.

(6) Because a spiral spring 50 is used, the spiral spring 50 can be incorporated without particularly increasing the installation space compared with an arrangement that uses a U-shaped spring or a cantilevered spring even if the number of windings in the spiral spring 50 is increased in order to assure a large displacement.

In addition, a large displacement can be assured by using a spiral spring 50, and a substantially constant elastic energy can be produced irrespective of the displacement of the spiral spring 50. The spiral spring 50 therefore exerts substantially constant elastic energy on the second rotor transmission wheel 60 regardless of the magnitude of an external shock, and operation of the second rotor transmission wheel 60 can therefore be stabilized.

(7) Using the piezoelectric elements 22 as rectangular wafers helps reduce the thickness of the piezoelectric drive device 10.

(8) The distance moved by the hand 2 can be accurately set as a result of using a detection circuit 107 to detect movement of the first rotor transmission wheel 40 and thereby the rotor. More specifically, because the vibrator 20 of the piezoelectric actuator 4 and the rotor transfer torque by means of friction, it is difficult to use the drive time of the piezoelectric actuator 4 to accurately control the rotation of the rotor. However, by using a detection circuit 107 to detect the movement of the rotor or the first rotor transmission wheel 40 that directly drives the rotor, and stopping drive when the detection circuit 107 detects that the rotor has rotated a specific amount, this embodiment of the invention can accurately move the rotor and thereby the hand 2.

Embodiment 2

A piezoelectric drive device 10A in a timepiece according to a second embodiment of the invention is described next with reference to FIG. 11 to FIG. 14.

Figure 11:
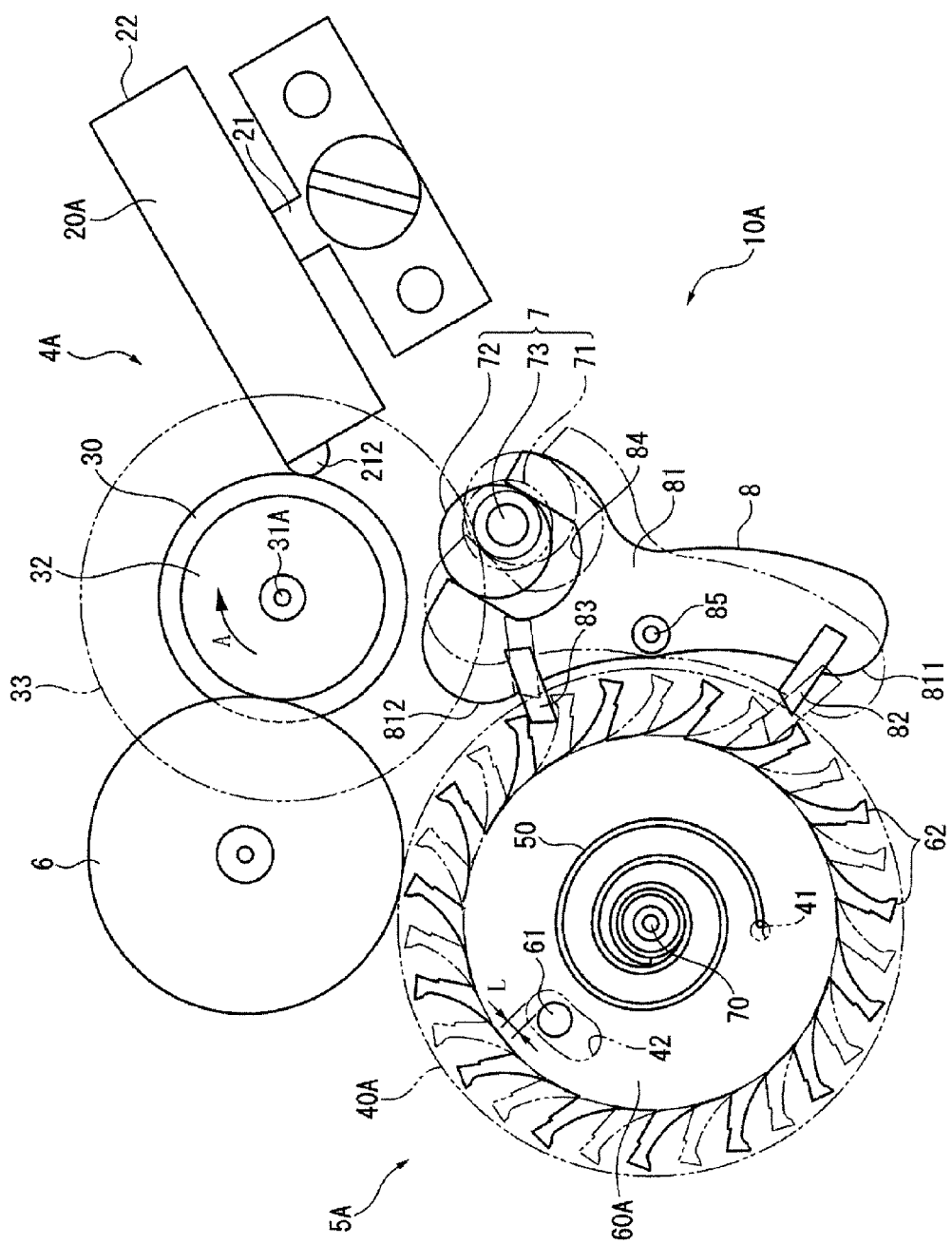
FIG. 11 is a plan view of a piezoelectric drive device according to a second embodiment of the invention.
Figure 12:
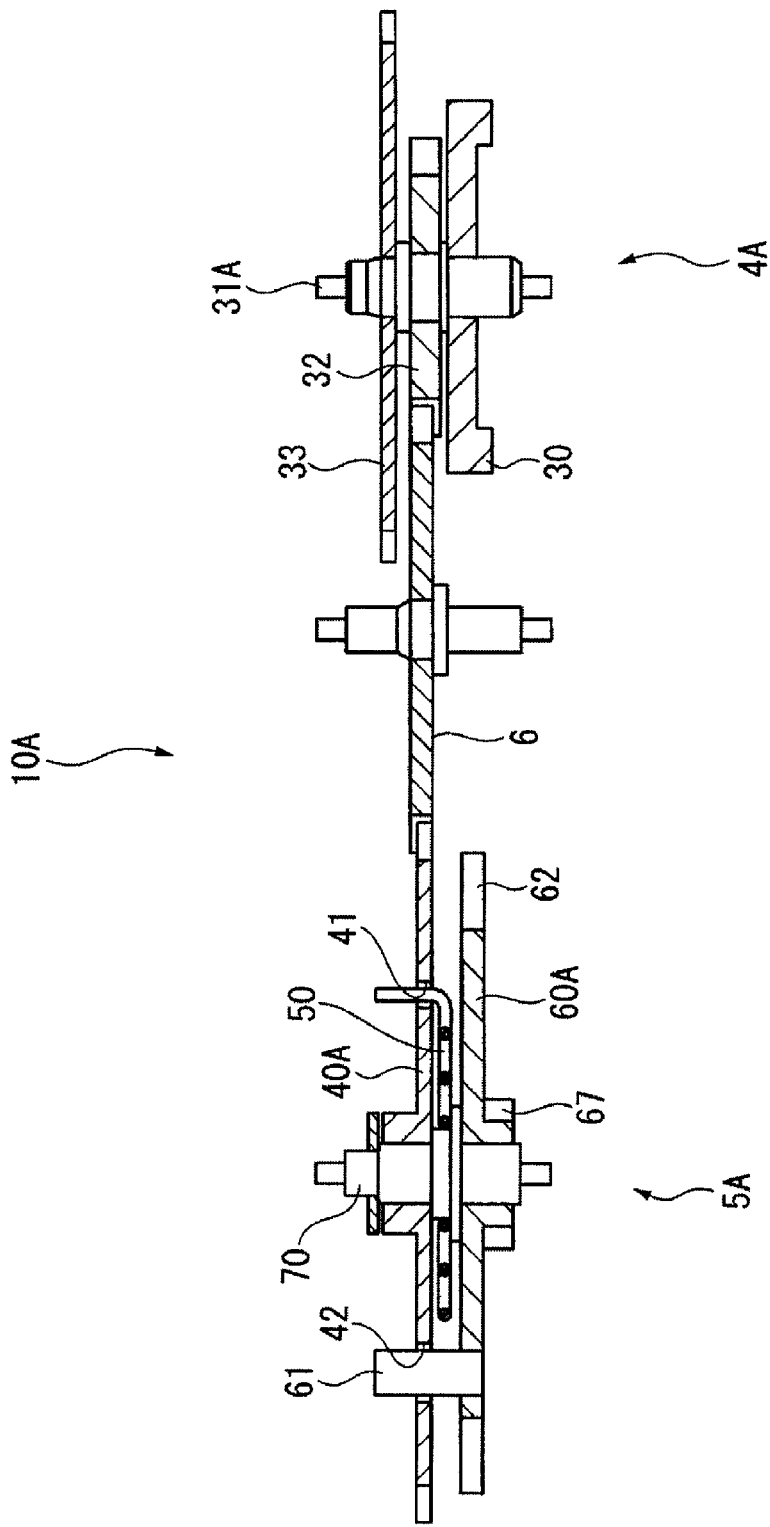
FIG. 12 is a longitudinal section view of the piezoelectric drive device.
Figure 13:
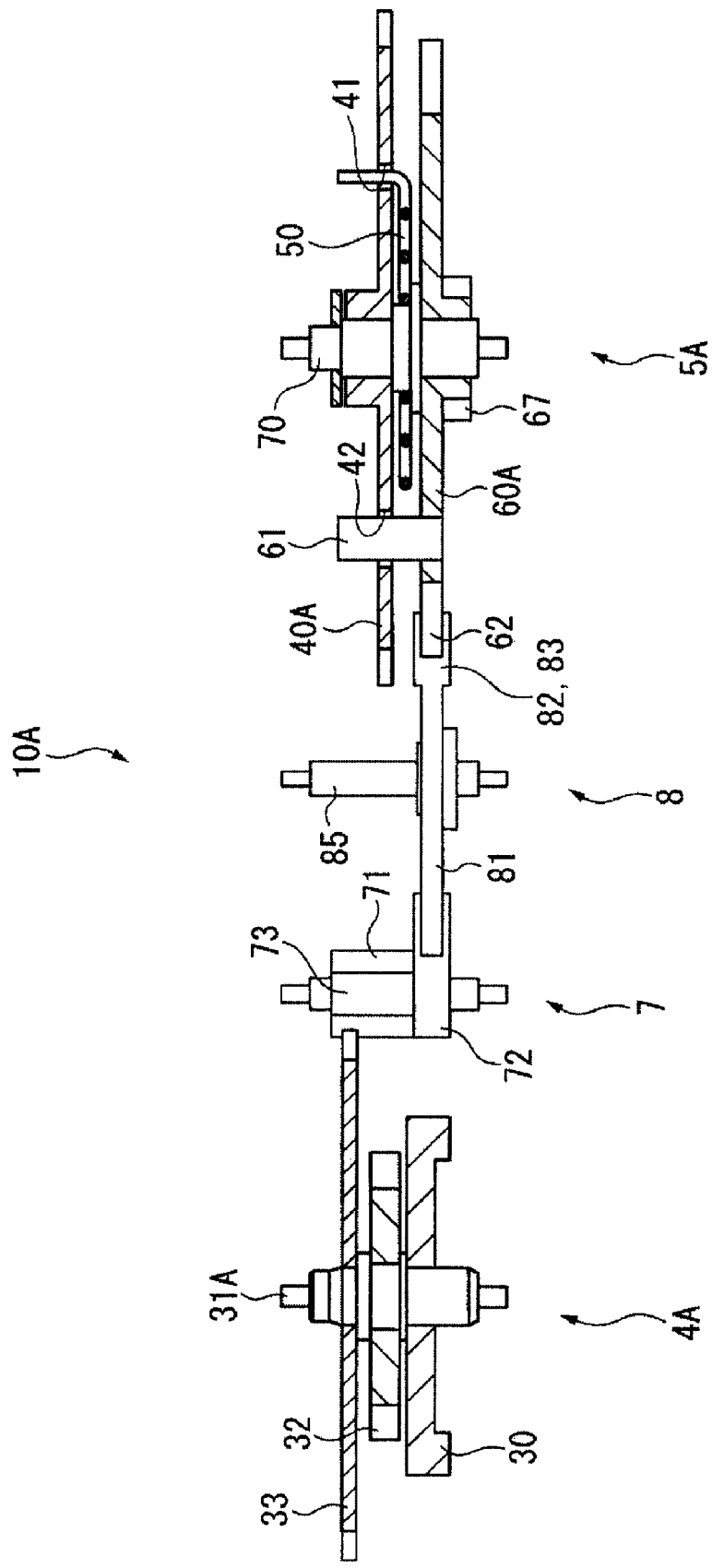
FIG. 13 is a longitudinal section view of the piezoelectric drive device.
Figure 14:
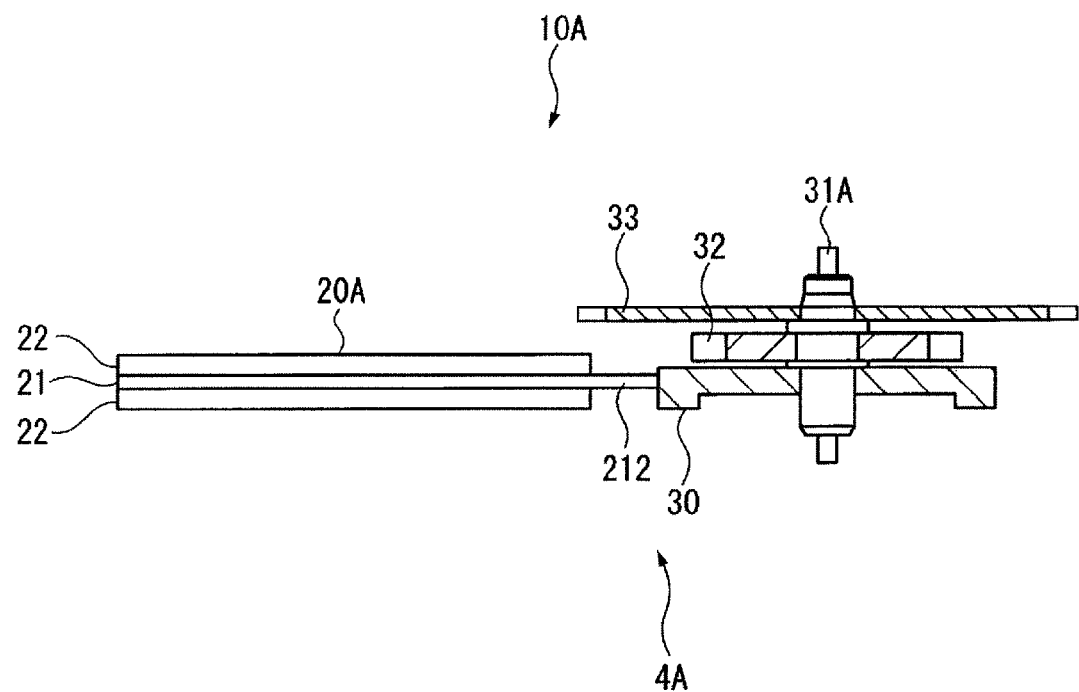
FIG. 14 is a longitudinal section view of the piezoelectric drive device.

FIG. 11 is a plan view of the piezoelectric drive device 10A in this timepiece. FIG. 12 to FIG. 14 are longitudinal section views of the piezoelectric drive device 10A. FIG. 12 is a section view of the transmission path connecting the rotor (rotor ring 30, rotor pinion 32, and rotor wheel 33), intermediate wheel 6, and rotor transmission wheel 5A. FIG. 13 is a section view of the transmission path connecting the rotor, pallet fork 8, and rotor transmission wheel 5A in FIG. 11. FIG. 14 is a section view of the piezoelectric actuator 4A including a vibrator 20A and rotor in FIG. 11.

The piezoelectric drive device 10A differs from the piezoelectric drive device 10 in the first embodiment by having an escape wheel 60A corresponding to a second rotor transmission wheel, and limiting rotation of the escape wheel 60A to a specific angle of rotation by means of the pallet fork 8, which is driven by the piezoelectric actuator 4A. The piezoelectric drive device 10A is otherwise the same as the foregoing piezoelectric drive device 10.

For example, the arrangement and operation of the piezoelectric actuator 4, the arrangement and operation of the spring 36, the arrangement and operation of the spiral spring 50, the basic structure and basic operation of the release limiting unit (positioning hole 42 and positioning pin 61), and the circuit arrangement and operation of the timepiece (FIG. 8) are the same in the first embodiment and this second embodiment. The optical detection means for detecting rotation of the first rotor transmission wheel 40 in the first embodiment is also used to detect rotation of a rotor transmission wheel 40A in the second embodiment, and the operation is the same.

The piezoelectric drive device 10A has a piezoelectric actuator 4A, an intermediate wheel 6 driven by the piezoelectric actuator 4A, a rotor transmission wheel 5A that transfers torque from the intermediate wheel 6 to the wheel 3 shown in FIG. 6, a cam wheel 7 (cam member) driven by the piezoelectric actuator 4A, and the pallet fork 8 that is swung by the cam wheel 7.

The piezoelectric actuator 4A has a vibrator 20A and rotor ring 30. The rotor pinion 32 and rotor wheel 33 are fixed to the axle 31A of the rotor ring 30. The rotor pinion 32 transfers torque to the intermediate wheel 6, and the rotor wheel 33 transfers torque to the cam wheel 7. The rotor ring 30, the rotor pinion 32, and the rotor wheel 33 is the rotor in this embodiment of the invention. The piezoelectric actuator 4A therefore differs from the piezoelectric actuator 4 of the first embodiment in the addition of the rotor wheel 33, and the configuration, material, and operation of the vibrator 20A, rotor ring 30, and rotor pinion 32 are the same as in the first embodiment.

The rotor transmission wheel 5A includes the rotor transmission wheel 40A that meshes with the intermediate wheel 6, the spiral spring 50, the escape wheel 60A, and the transmission wheel axle 70. This arrangement is a second transmission path. One end of the spiral spring 50 is caught in the spring engaging hole 41 of the rotor transmission wheel 40A, and the other end is connected to the escape wheel 60A. The second transmission path transfers drive power from the rotor ring 30 to the spiral spring 50.

As in the first embodiment, a spring engaging hole 41 and a positioning hole 42 are formed passing in the axial direction through the rotor transmission wheel 40A.

The escape wheel 60A has fifteen escape teeth 62, and is supported at a position enabling engagement with the pallet fork 8. The escape wheel 60A and an escape pinion 67 (FIG. 12) are fixed to the transmission wheel axle 70. The escape pinion 67 rotates in unison with the escape wheel 60A, and engages a hand wheel not shown. The rotor transmission wheel 40A is supported rotatably on the transmission wheel axle 70. Because the other end of the spiral spring 50 is fixed to the transmission wheel axle 70, the escape wheel 60A is connected to the other end of the spiral spring 50.

Similarly to the second rotor transmission wheel 60 in the first embodiment, a positioning pin 61 that projects toward the rotor transmission wheel 40A and is inserted to the positioning hole 42 is fixed to the escape wheel 60A.

As described in the first embodiment, the positioning hole 42 and positioning pin 61 are provided to hold the initial deflection of the spiral spring 50 when assembling the rotor transmission wheel 5A and when assembling the rotor transmission wheel 5A and other parts to the main plate, for example, as shown in FIG. 11.

The cam wheel 7 has a cam pinion 71 that meshes with the rotor wheel 33, a round cam 72, and a cam shaft 73 to which the cam pinion 71 and cam 72 are affixed. The axis of rotation of the cam 72 is eccentric to the cam wheel 7 axle and offset toward the outside circumference of the cam 72.

The pallet fork 8 includes a pallet body 81, two claws 82 and 83, a fork 84 that holds the cam 72, and a pallet pivot pin 85.

The pallet body 81 has a first arm part 811 and a second arm part 812 formed with the pallet pivot pin 85 therebetween and supported swingably on the pallet pivot pin 85. The first arm part 811 extends from the pallet pivot pin 85 away from the rotor wheel 33, and holds the claw 82 projecting toward the escape wheel 60A. The second arm part 812 extends toward the rotor wheel 33 from the pallet pivot pin 85, and supports the claw 83 projecting toward the escape wheel 60A.

The width of the second arm part 812 increases from the pallet pivot pin 85 with proximity to the rotor ring 30. The fork 84 is formed in this widened area, and the second arm part 812 has a generally U-shaped configuration. The cam wheel 7 is disposed so that the side of the cam 72 contacts the inside surface of the fork 84.

When the rotor wheel 33 in this arrangement rotates, the cam wheel 7 rotates and the eccentric cam 72 makes the pallet fork 8 to swing. When the cam wheel 7 rotates one revolution, the pallet fork 8 swings back and forth only once and the two claws 82 and 83 of the pallet fork 8 alternately engage the escape wheel 60A. This arrangement thus is a first transmission path that transfers drive power from the rotor ring 30 to the pallet fork 8.

When the escape wheel 60A in this arrangement rotates, the two claws 82 and 83 are alternately inserted between the escape teeth 62, thereby limiting the angle of rotation of the escape wheel 60A to a constant angle. More specifically, when the pallet fork 8 swings in a first direction (counterclockwise in FIG. 1), the one claw 83 of the pallet fork 8 is inserted between the escape teeth 62 so that rotation of the escape wheel 60A, which is rotationally driven clockwise, stops when the claw 83 contacts the next escape tooth 62.

When the pallet fork 8 then swings in the second direction (clockwise in FIG. 11), the one claw 83 of the pallet fork 8 disengages the escape tooth 62 and releases the escape wheel 60A. The other claw 82 is inserted at the same time between escape teeth 62 and the escape wheel 60A rotates an angle equal to the half pitch of the escape teeth 62 until this other claw 82 of the pallet fork 8 contacts another escape tooth 62 of the escape wheel 60A, thereby stopping rotation of the escape wheel 60A again.

In this embodiment of the invention the escape wheel 60A is the driven body and the pallet fork 8 is a rotation limiting device.

The vibrator 20 of the piezoelectric actuator 4 is fastened to the main plate as the base frame of the timepiece 1. One end of the rotor axle 31, the axle of the intermediate wheel 6, the transmission wheel axle 70, the cam shaft 73 of the cam wheel 7, the pallet pivot pin 85, and the axle of the wheel 3 is held in a bearing hole in the main plate, and the other end of each axle is held by a bearing in a wheel train bridge disposed opposite the main plate. Note that one end of the axle of the wheel 3 and the axles of the other hand wheels is supported by the main plate but the other ends can be supported by a bridge other than the wheel train bridge.

The escape wheel 60A, the pallet fork 8, and the wheels that are rotated by the escape wheel 60A are preferably made from a non-magnetic material, but the materials thereof are not limited to non-magnetic materials.

The circuit arrangement of this embodiment of the invention is the same as the arrangement of the first embodiment, and has an optical position detection means and detection circuit 107 for detecting the rotational position of the rotor. When the rotor is driven to a specific position, the position detection means outputs a prescribed position detection signal to the control circuit 104. When the control circuit 104 receives this detection signal, the control circuit 104 controls the timepiece drive circuit 106 to stop outputting the drive signal, that is, stops the piezoelectric drive device 10.

The detection circuit 107 can directly detect movement of the rotor ring 30, the rotor wheel 33, or other part of the rotor. The detection circuit 107 can also indirectly detect rotor movement by, for example, detecting movement of the intermediate wheel 6, rotor transmission wheel 40A, or other member that is on the rotor side of the torque transmission path from the spiral spring 50 and is driven synchronously to the rotor.

Furthermore, by providing the pallet fork 8 and escape wheel 60A, movement of the escape wheel 60A, and thereby the hand 2, can also be controlled with good precision. The detection circuit that controls stopping driving the piezoelectric actuator 4A can therefore be set so that the piezoelectric actuator 4A can be reliably driven from where one of the claws 82 and 83 of the pallet fork 8 engages an escape tooth 62 of the escape wheel 60A until the other claw 82 or 83 engages an escape tooth 62.

This embodiment of the invention is arranged so that engagement of the claws 82 and 83 of the pallet fork 8 with the escape teeth 62 changes when the rotor ring 30 rotates 30°. In this case the detection circuit simply detects if the rotor ring 30 has rotated 30°.

Considering detection error in the detection circuit, for example, the detection circuit can be configured to detect when the rotor ring 30 rotates 31°, and can be set to detect if the rotor rotates at least 30°. The angle of rotation of the cam wheel 7 is slightly greater in this case, but because the change in the distance from the cam shaft 73 to the side of the cam 72 that contacts engages the fork 84 is small as shown in FIG. 11, there is substantially no movement of the pallet fork 8 and the claw 82 or 83 of the pallet fork 8 remains engaged with the escape tooth 62. Furthermore, while the rotor transmission wheel 40A rotates relative to the escape wheel 60A that is engaged with and stopped by the claws 82 and 83 of the pallet fork 8 if the rotor overruns slightly, this amount of rotation can be absorbed by the spiral spring 50 winding, the change in the elastic energy of the spiral spring 50 is minimal, and there is no affect on movement of the hand 2.

Operation of the piezoelectric drive device 10A is described next.

The rotor ring 30 and thus the rotor are rotated clockwise by the vibrator 20A in the direction of arrow A in FIG. 11. Rotation of the rotor ring 30 is transmitted to the intermediate wheel 6 and the cam wheel 7. Rotation of the intermediate wheel 6 is passed to the rotor transmission wheel 40A. Rotation of the rotor transmission wheel 40A is transmitted by the elastic energy of the spiral spring 50 to the escape wheel 60A.

The wheel train from the rotor ring 30 to the rotor transmission wheel 40A is set so that when the rotor ring 30 rotates 30°, the rotation is slowed so that the rotor transmission wheel 40A rotates 12°. The wheel train also accelerates and transmits rotation of the rotor ring 30 to the cam wheel 7 so that when the rotor ring 30 rotates 30° the cam wheel 7 rotates 180°.

While the pallet fork 8 prevents the escape wheel 60A from rotating, the spiral spring 50 is elastically deformed and stores the rotational energy of the rotor ring 30 as elastic energy while the escape wheel 60A remains stopped. The cam wheel 7 then rotates, the eccentricity of the cam 72 makes the pallet fork 8 to swing, and when the claw of the pallet fork 8 engaged with the escape wheel 60A separates from the engaged escape tooth 62 of the escape wheel 60A, the escape wheel 60A is rotated by the elastic energy of the spiral spring 50, and the distal end of the other claw of the pallet fork 8 enters between the escape teeth 62. When the other claw of the pallet fork 8 is further inserted between the escape teeth 62 and the escape tooth 62 contacts the claw, the escape wheel 60A is again stopped from rotating. When the pallet fork 8 swings one full cycle back and forth, the escape wheel 60A rotates one pitch (24 degrees). As a result, when the rotor ring 30 rotates 30°, the cam wheel 7 rotates 180°, causing the pallet fork 8 to swing one way and the escape wheel 60A to rotate 12°. Because the rotor transmission wheel 40A rotates 12°, the spiral spring 50 returns to the initial state. The escape wheel 60A is thus driven intermittently by the swinging of the pallet fork 8.

If the swinging cycle of the pallet fork 8 starts with the one claw 83 of the pallet fork 8 engaged with a escape tooth 62 of the second rotor transmission wheel 60 as shown in FIG. 11, the cycle starts when the cam 72 starts to rotate, the one claw 83 disengages the escape tooth 62, the other claw 82 of the pallet fork 8 engages another escape tooth 62, this other claw 82 then disengages this other escape tooth 62 and the one claw 83 again engages a escape tooth 62 of the escape wheel 60A, and the cam 72 stops rotating. One cycle of the pallet fork 8 is thus one swinging cycle of the pallet fork 8.

When the rotor transmission wheel 5A is initially assembled, the initial deflection of the spiral spring 50 is held by contact between the positioning pin 61 and positioning hole 42, and the gap between the positioning pin 61 and positioning hole 42 is therefore 0.

This is achieved by setting the positioning hole 42 and positioning pin 61 so that there is a gap L therebetween when an escape tooth 62 contacts claw 83 or 82 of the pallet fork as shown in FIG. 11. This gap is set so that the gap is not zero when an escape tooth 62 contacts claw 83 or 82 of the pallet fork even if there is variation in the assembly position and the relationship between the parts. Providing a gap of dimension L assures that the escape teeth 62 can be reliably engaged by the claws 82 and 83 of the pallet fork.

By forming a gap of dimension L, the pallet fork 8 is correctly positioned in a specific position by the escape wheel 60A. That is, when an escape tooth 62 is in contact with the claw 83 of the pallet fork 8, the force of the spiral spring 50 makes the escape tooth 62 to push against the claw 83 of the pallet fork 8 and thereby makes the pallet fork 8 to rotate counterclockwise. The pallet fork 8 is thus positioned with the escape tooth 62 contacting the claw 83 of the pallet fork 8.

While the escape tooth 62 is in contact with the other claw 82 of the pallet fork 8, the force of the spiral spring 50 makes the escape tooth 62 to push against the other claw 82 of the pallet fork 8 so that the pallet fork 8 pivots clockwise in FIG. 11. The pallet fork 8 is thus positioned with the escape tooth 62 contacting the claw 82 of the pallet fork 8.

Because the elastic energy of the spiral spring 50 urges the escape wheel 60A to rotate clockwise, friction between the claws 82 and 83 of the pallet fork 8 and the escape tooth 62 increases when they are touching.

Furthermore, because the pallet fork 8 is linked by the cam mechanism of the cam wheel 7, rotational energy is not transferred from the pallet fork 8 to the cam wheel 7 even if external shock makes the pallet fork 8 to swing. Therefore, because the force of an impact in the direction causing the pallet fork 8 to swing is not transmitted as a force causing the cam 72 to rotate, the pallet fork 8 will not swing and release the escape wheel 60A, and the position of the timepiece hand, for example, will not change.

In addition to the effects (1) to (8) of the invention described above, this embodiment also enables the following.

(9) Driving the piezoelectric actuator 4A applies rotational energy to the escape wheel 60A while rotation of the escape wheel 60A is limited to a specific angular increment by the pallet fork 8. As a result, even if rotation of the escape wheel 60A is not constant for a given amount the piezoelectric actuator 4A is driven, once the escape wheel 60A rotates a prescribed angle, the pallet fork 8 limits further rotation of the escape wheel 60A to this prescribed angle of rotation, and the escape wheel 60A therefore accurately rotates a constant amount. Because overrun of the escape wheel 60A, which is rotated by the piezoelectric actuator 4A, is thus prevented, precisely controlling the angle of rotation of the rotor ring 30 is not necessary, the precision of the angle of rotation of the escape wheel 60A can be improved, and the display precision of the display means, such as the hand 2, that is rotated by the escape wheel 60A can be improved.

(10) Furthermore, movement of the escape wheel 60A, and therefore the hand 2, can be controlled with good precision by providing the pallet fork 8 and escape wheel 60A. As a result, even if the detection circuit is set to detect when the rotor has rotated slightly more than a prescribed target value to allow for detection error, any overrun can be absorbed by the cam wheel 7, the pallet fork 8, the escape tooth 62, and the spiral spring 50, and the escape wheel 60A and hand 2 can be driven accurately.

(11) Furthermore, because the claws 82 and 83 of the pallet fork 8 engage the escape wheel 60A, the wheel train can be prevented from rotating when a crown or other time adjustment mechanism is manipulated to adjust the time. The function of the control lever that restricts rotation of the wheel train when setting the time in a common quartz watch is thus also achieved, and this embodiment of the invention eliminates the need for this control lever.

(12) Because a common driver can be used for the escape wheel 60A and the pallet fork 8, the parts count can be reduced and the size of the timepiece can be reduced.

(13) Because a cam 72 is used to swing the pallet fork 8 in two directions, the piezoelectric actuator 4A that drives the pallet fork 8 only needs drive in one direction, but not in two rotational directions. More particularly, by using a flat rectangular vibrator 20A that produces a one-way rotation, the position where the vibrator 20A contacts the rotor ring 30 can be freely determined to improve drive power transmission efficiency, reduce power consumption, and increase torque.

Embodiment 3

A piezoelectric drive device 10B in a timepiece according to a third embodiment of the invention is described next with reference to FIG. 15 to FIG. 18.

Figure 15:
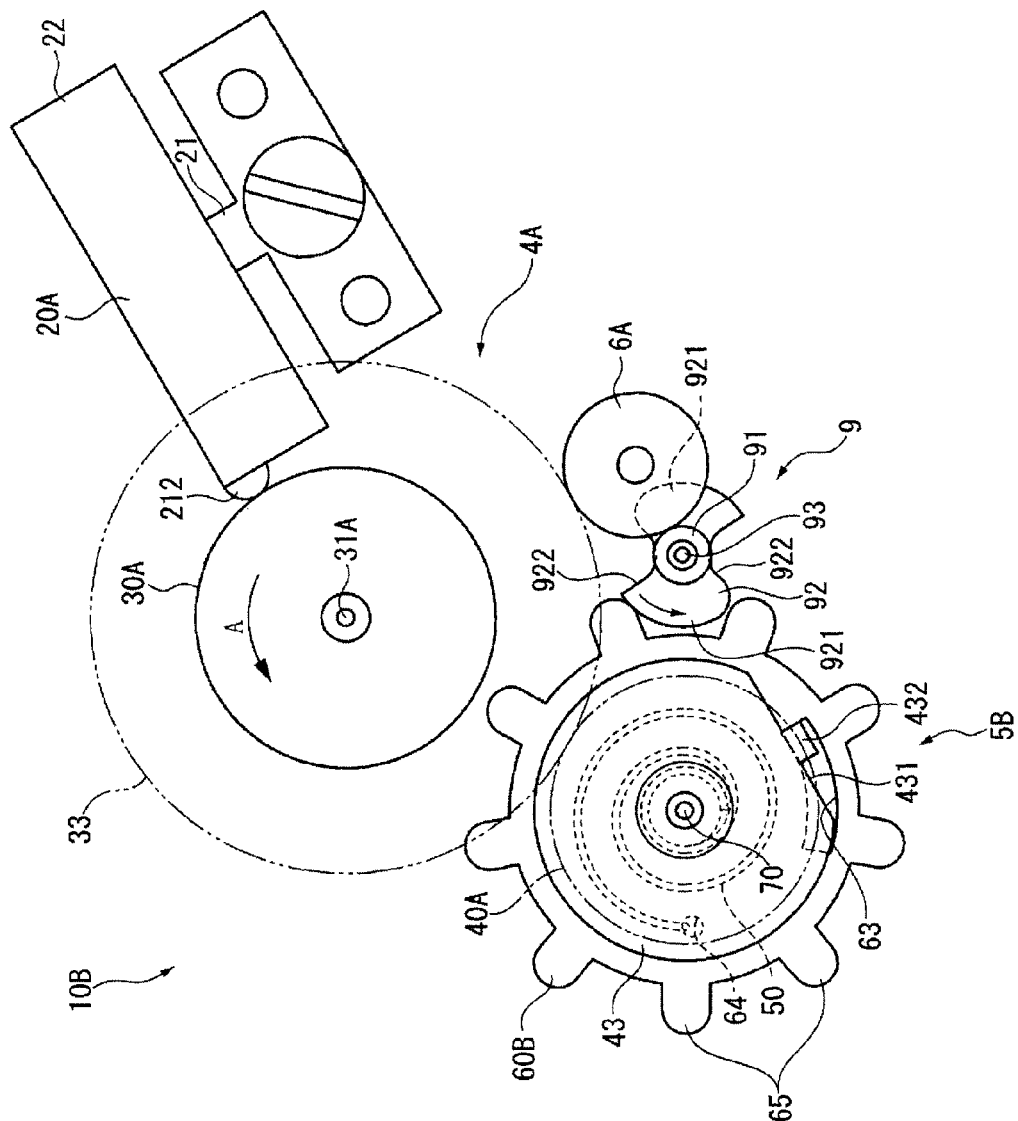
FIG. 15 is a plan view of a piezoelectric drive device according to a third embodiment of the invention.
Figure 16:
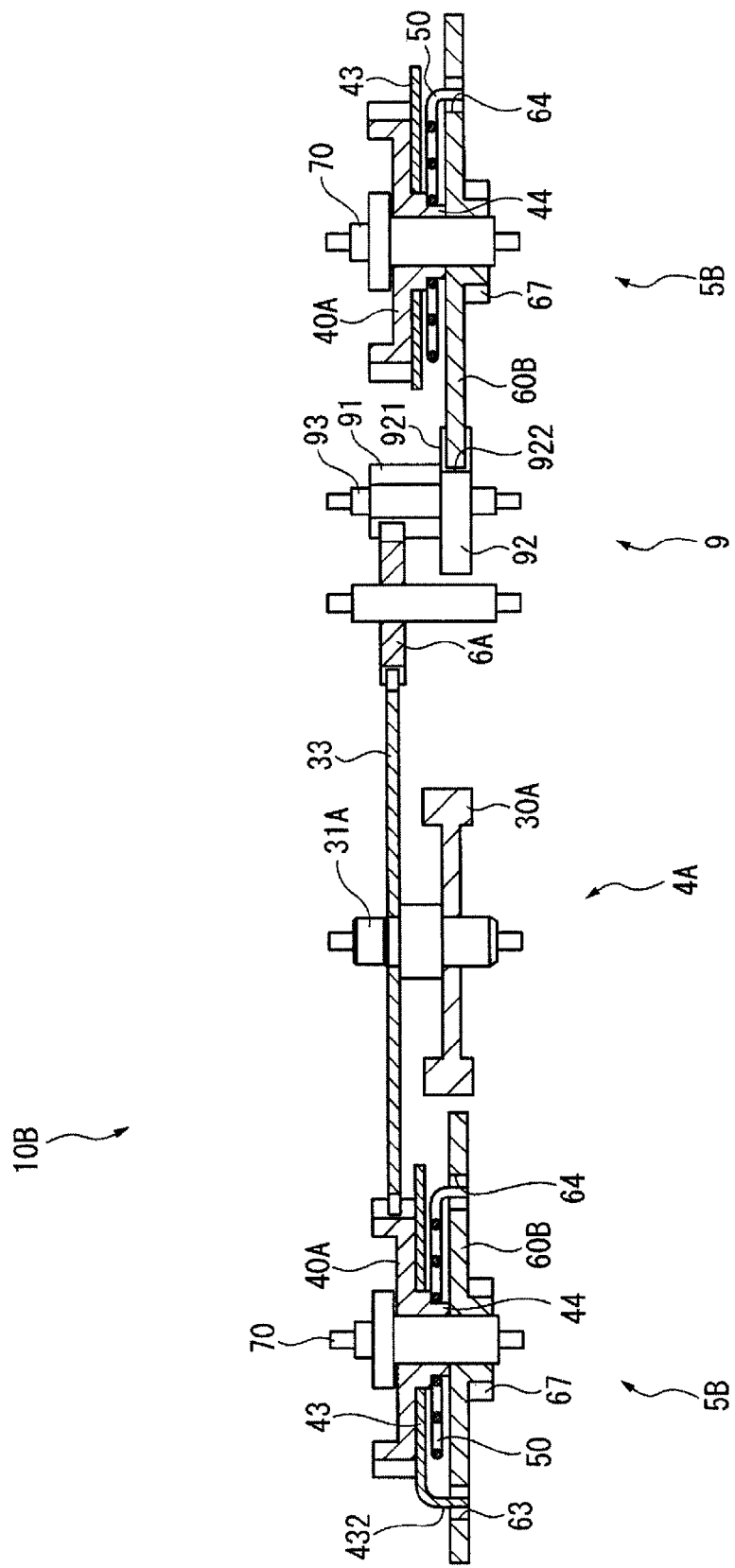
FIG. 16 is a longitudinal section view of the piezoelectric drive device.
Figure 17:
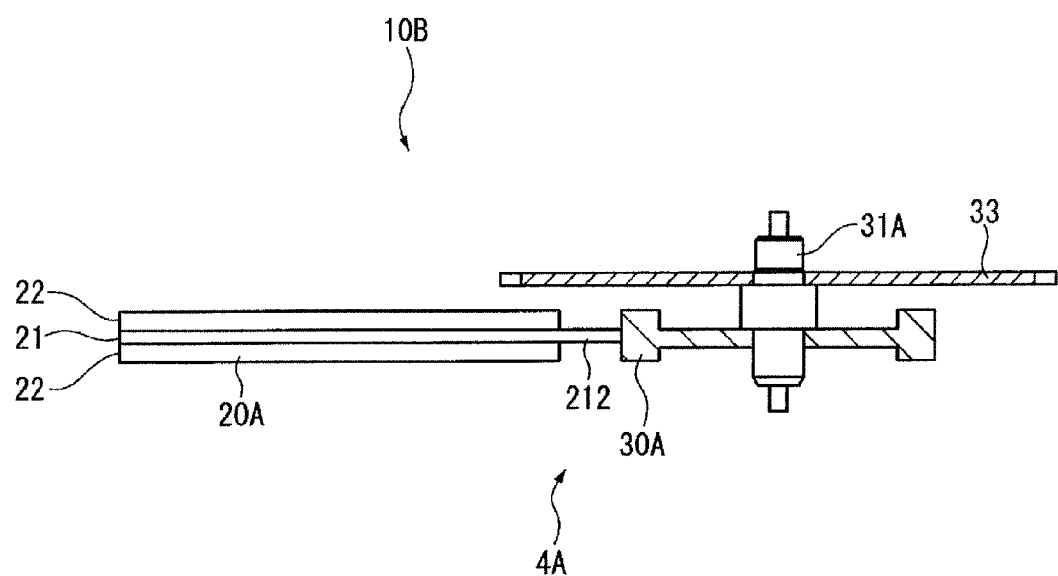
FIG. 17 is a longitudinal section view of the piezoelectric drive device.
Figure 18:
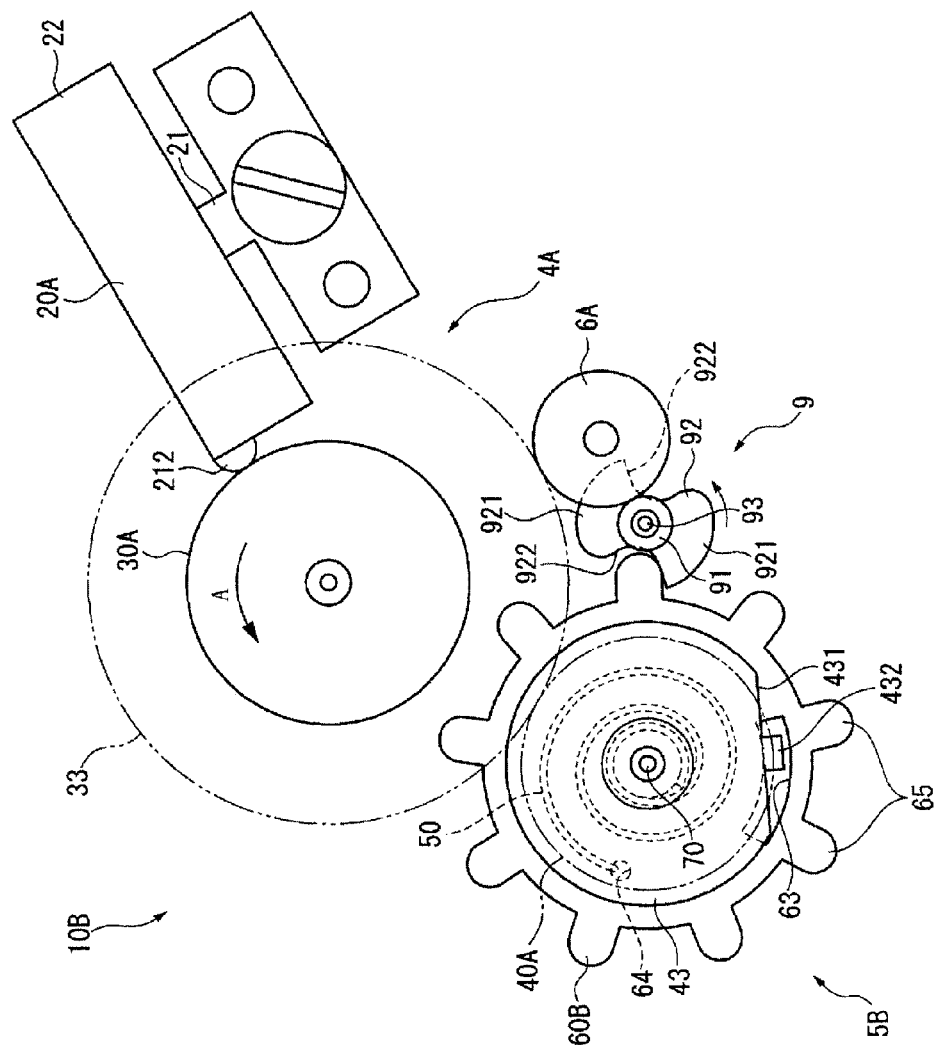
FIG. 18 is a plan view of the piezoelectric drive device.

FIG. 15 is a plan view of the piezoelectric drive device 10B in this timepiece. FIG. 16 and FIG. 17 are longitudinal section views of the piezoelectric drive device 10B. FIG. 18 is a plan view describing driving the piezoelectric drive device 10B.

This piezoelectric drive device 10B differs from the piezoelectric drive device 10A of the second embodiment by using a follower 60B instead of the escape wheel 60A, and using a drive wheel 9 instead of the pallet fork 8 as a rotation limiting device, and is otherwise the same.

The piezoelectric drive device 10B includes an intermediate wheel 6A that meshes with and is rotated by the rotor ring 30A, the drive wheel 9 that is rotated by the intermediate wheel 6A, and the rotor transmission wheel 5B.

The rotor ring 30A is fixed with the rotor wheel 33 to the rotor axle 31A, and the rotor ring 30A and rotor wheel 33 together constitutes the rotor of the invention.

The drive wheel 9 includes a drive pinion 91 that meshes with the intermediate wheel 6A, a drive cam 92, and a cam shaft 93 that secures the 91 and drive cam 92.

The power cam 92 has two basically fan-shaped cam lobes 921 formed radially to the cam shaft 93. The two cam lobes 921 are formed 180° apart on the cam shaft 93, and are point symmetrical to the cam shaft 93. A concave face 922 is formed at a position offset 90° in both directions from each cam lobe 921, and these two concave faces 922 are mutually opposed around the cam shaft 93.

The rotor transmission wheel 5B includes the rotor transmission wheel 40A, spiral spring 50, follower 60B, and transmission wheel axle 70. As shown in FIG. 16, the rotor transmission wheel 40A, spiral spring 50, and follower 60B are disposed in order to the transmission wheel axle 70 as the axis of rotation.

The rotor transmission wheel 40A engages the rotor wheel 33, and is supported rotatably by the transmission wheel axle 70. A positioning plate 43 is fixed to the rotor transmission wheel 40A. The positioning plate 43 is a flat disc with a chord-like flat 431 formed at one part of the side. A positioning key 432 is formed projecting radially from the center of the flat 431. The positioning key 432 curves in the middle to the follower 60B with the distal end extending toward the follower 60B.

The follower 60B is attached to the transmission wheel axle 70. A positioning hole 63 and spring engaging hole 64 are formed passing through the follower 60B in the axial direction. The positioning hole 63 is a long slot formed in line with the circumference of the follower 60B, and the distal end of the positioning key 432 is inserted in the positioning hole 63. Nine follower teeth 65 are formed every 40° projecting radially from the outside circumference of the follower 60B, and the distal end part of the follower teeth 65 is semicircularly shaped.

The outside circumference end of the spiral spring 50 is held in the spring engaging hole 64, and the inside circumference end is fixed and wound to the barrel 44 of the rotor transmission wheel 40A.

The drive wheel 9 and the rotor transmission wheel 5B are positioned so that the follower teeth 65 and cam lobes 921 are engaged. The positioning plate 43 and positioning hole 63 thus constitutes a release limiting unit in this embodiment of the invention. The rotor ring 30A thus transfers rotation to the intermediate wheel 6A and rotor transmission wheel 40A. The drive wheel 9 thus is a rotation limiting device. And the drive wheel 9 and follower 60B constitute a Geneva mechanism.

This embodiment also has a detection circuit for detecting rotor rotation as in the first and second embodiments. Likewise, the detection circuit can directly detect movement of the rotor ring 30A, the rotor wheel 33, or other part of the rotor, or indirectly detect rotor movement by, for example, detecting movement of the rotor transmission wheel 40A or other member that is on the rotor side of the torque transmission path from the spiral spring 50 and is driven synchronously to the rotor.

Furthermore, by using a Geneva mechanism with the drive wheel 9 and follower 60B, movement of the follower 60B, and thereby the hand 2, can also be controlled with good precision in the same way as movement of the hand 2 is controlled using the pallet fork 8 and escape wheel 60A in the second embodiment. The detection circuit is also set so that when the rotor ring 30A moves at least a prescribed angle can be reliably detected. If the rotor overruns, the overrun displacement can also be absorbed by the engagement of the drive wheel 9 and follower 60B and by the spiral spring 50 so that the overrun does not affect movement of the hand 2.

Operation of the piezoelectric drive device 10B is described next.

The rotor ring 30A is rotated clockwise by the vibrator 20A in the direction of arrow A. Rotation of the rotor ring 30A is transmitted through the rotor wheel 33 to the intermediate wheel 6A and rotor transmission wheel 40A. Rotation of the intermediate wheel 6A is transmitted to the drive wheel 9. Rotation of the rotor transmission wheel 40A is transmitted by the elastic energy of the spiral spring 50 to the follower 60B.

The wheel train from the rotor ring 30A to the rotor transmission wheel 40A is set so that when the rotor ring 30A rotates 20°, the rotation is accelerated so that the rotor transmission wheel 40A rotates 40°, that is, so that the rotor transmission wheel 40A rotates at twice the speed of the rotor ring 30A. Rotation of the rotor ring 30A is also accelerated and transmitted to the drive wheel 9 so that the drive wheel 9 rotates 180° when the rotor ring 30A rotates 20°. The follower 60B is driven intermittently by the drive cam 92 of the drive wheel 9. While rotation of the follower 60B is restricted by the drive cam 92, the spiral spring 50 deforms elastically with the follower 60B stopped and stores the torque from the rotor ring 30A as elastic energy.

The drive wheel 9 continues rotating so that the cam lobe 921 limiting rotation of the follower 60B rotates counterclockwise. When the drive wheel 9 rotates so that the concave face 922 faces the follower 60B, the follower 60B is released and the elastic energy of the spiral spring 50 makes the follower 60B to start rotating (FIG. 18). The drive wheel 9 continues rotating, and when the opposite cam lobe 921 rotates to the position facing the follower 60B, this opposite cam lobe 921 engages the next follower teeth 65 and the drive wheel 9 again restricts rotation of the follower 60B.

The follower 60B rotates one pitch (40°) each time the drive wheel 9 rotates 180°. More specifically, when the rotor ring 30A rotates 20°, the drive wheel 9 rotates 180°, and the follower 60B rotates 40°. The rotor ring 30A thus makes the rotor transmission wheel 40A to rotate 40°, and the spiral spring 50 returns to the initial state.

In addition to the effects (1) to (13) of the invention described above, this embodiment also enables the following.

(14) Driving the piezoelectric actuator 4A applies rotational energy to the follower 60B while the drive wheel 9 limits rotation of the follower 60B to a specific angular increment. Therefore, even if rotation of the follower 60B is not constant for a given amount the piezoelectric actuator 4A is driven, once the follower 60B rotates a specific angle, the drive wheel 9 limits the angle of rotation of the follower 60B to this prescribed angle, and the follower 60B therefore accurately rotates a constant amount. Because overrun of the follower 60B, which is rotated by the piezoelectric actuator 4A, is thus prevented, precisely controlling the angle of rotation of the rotor ring 30A is not necessary, the precision of the angle of rotation of the follower 60B can be improved, and the display precision of the display means, such as the hand 2, that is rotated by the follower 60B can be improved.

Embodiment 4

The piezoelectric drive device 10C in a timepiece according to a fourth embodiment of the invention is described next with reference to FIG. 19 to FIG. 21.

Figure 19:
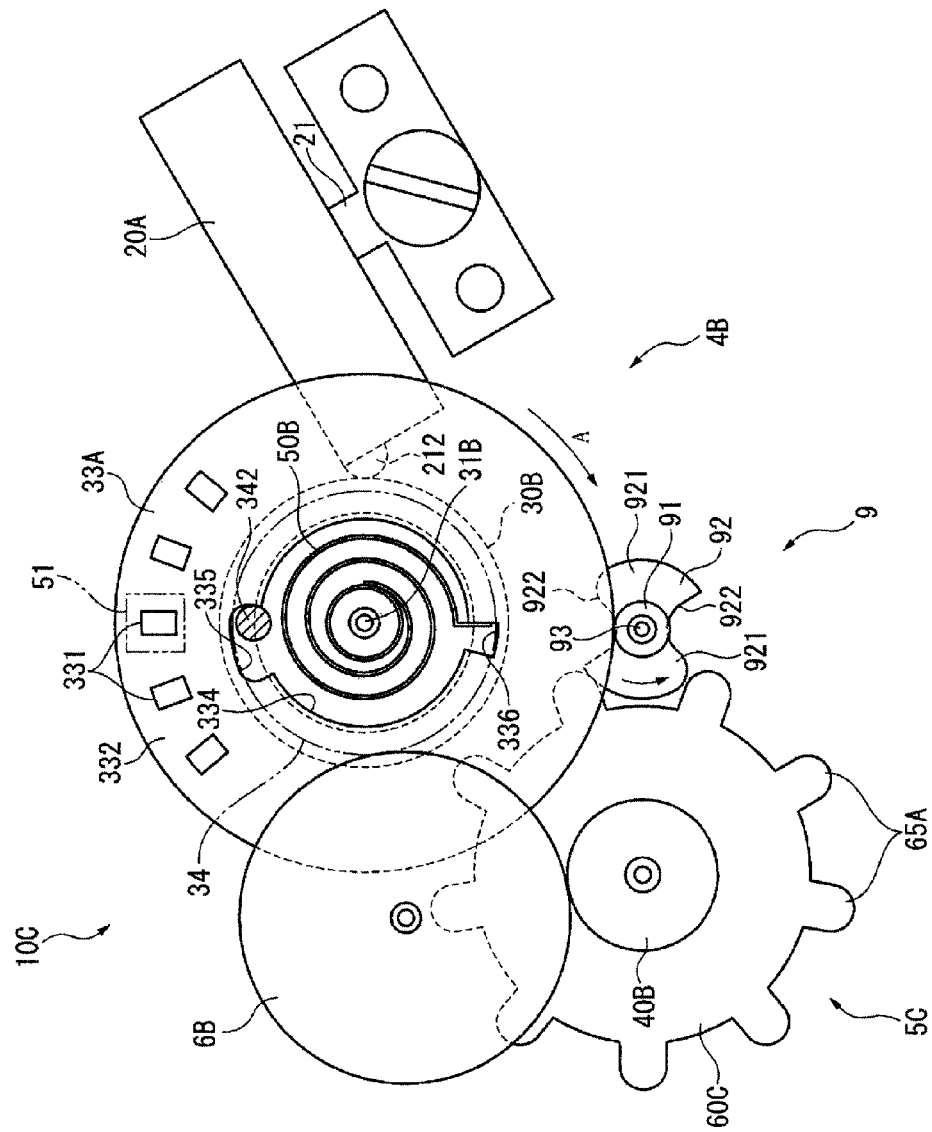
FIG. 19 is a plan view of a piezoelectric drive device according to a fourth embodiment of the invention.
Figure 20:
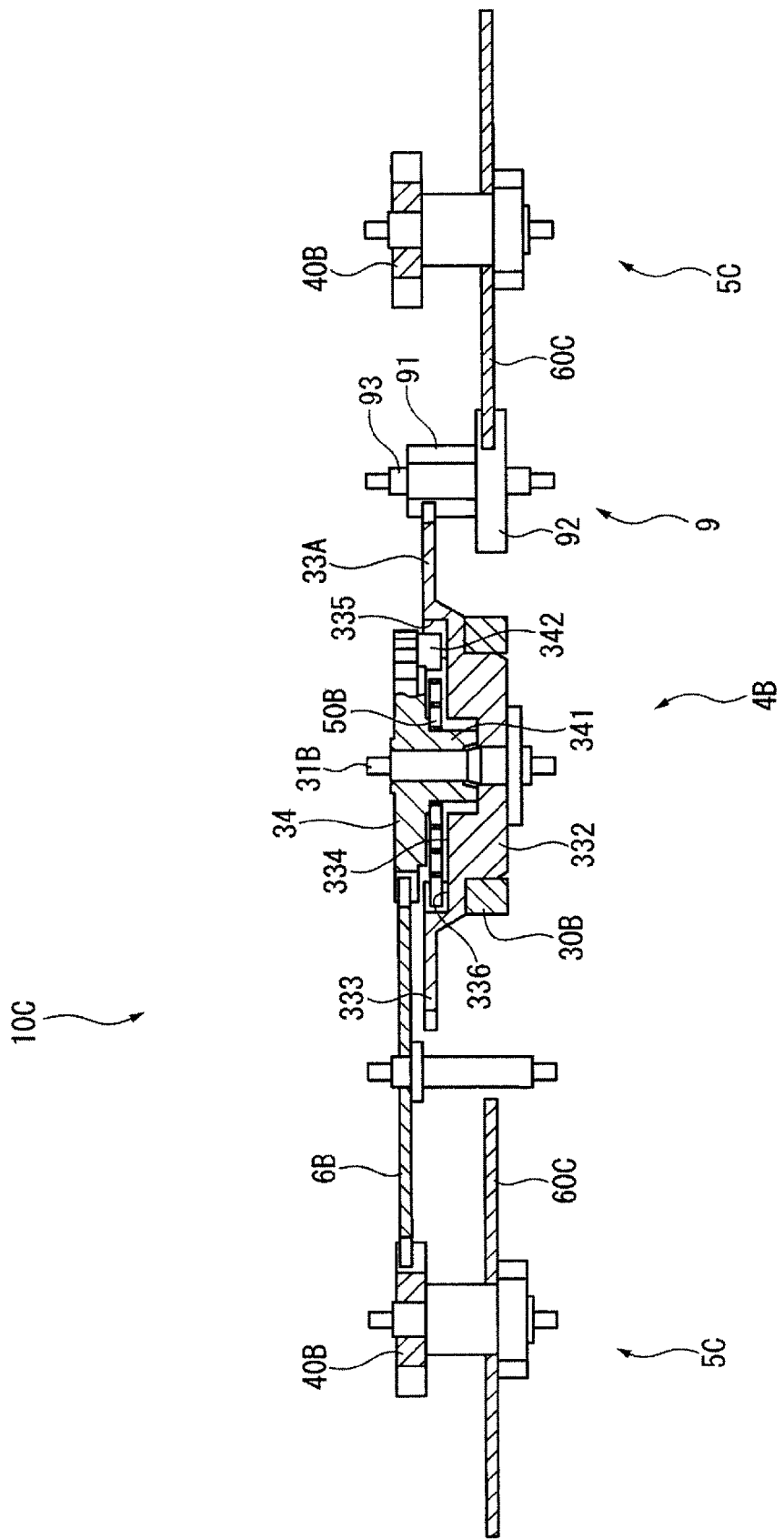
FIG. 20 is a longitudinal section view of the piezoelectric drive device.

FIG. 19 is a plan view of the piezoelectric drive device 10C in a timepiece. FIG. 20 and FIG. 21 are longitudinal section views of the piezoelectric drive device 10C. While the piezoelectric drive device 10B according to the third embodiment positions the spiral spring 50 between the rotor transmission wheel 40A and follower 60B, the piezoelectric drive device 10C according to this embodiment of the invention positions the spiral spring 50B between the rotor wheel 33A and the rotor transmission wheel 34, and is otherwise substantially the same. This embodiment also specifically describes the arrangement of the detection circuit 107.

The rotor ring 30B is fixed to the rotor wheel 33A, and the rotor ring 30B and rotor wheel 33A constitute the rotor in this embodiment of the invention. The rotor wheel 33A is plastic, for example, and is fixed to a metal rotor axle 31B. The rotor ring 30B, the rotor wheel 33A, and the rotor axle 31B are in unison.

The rotor wheel 33A includes a rotor wheel base 332 to which the rotor ring 30B is fit and secured, and a rotor wheel part 333 that extends radially from the end part of the rotor wheel 33A on the rotor transmission wheel 34 side. A spring recess 334 that houses the spiral spring 50B is also formed in the rotor transmission wheel 34 side of the rotor wheel base 332.

Figure 21:
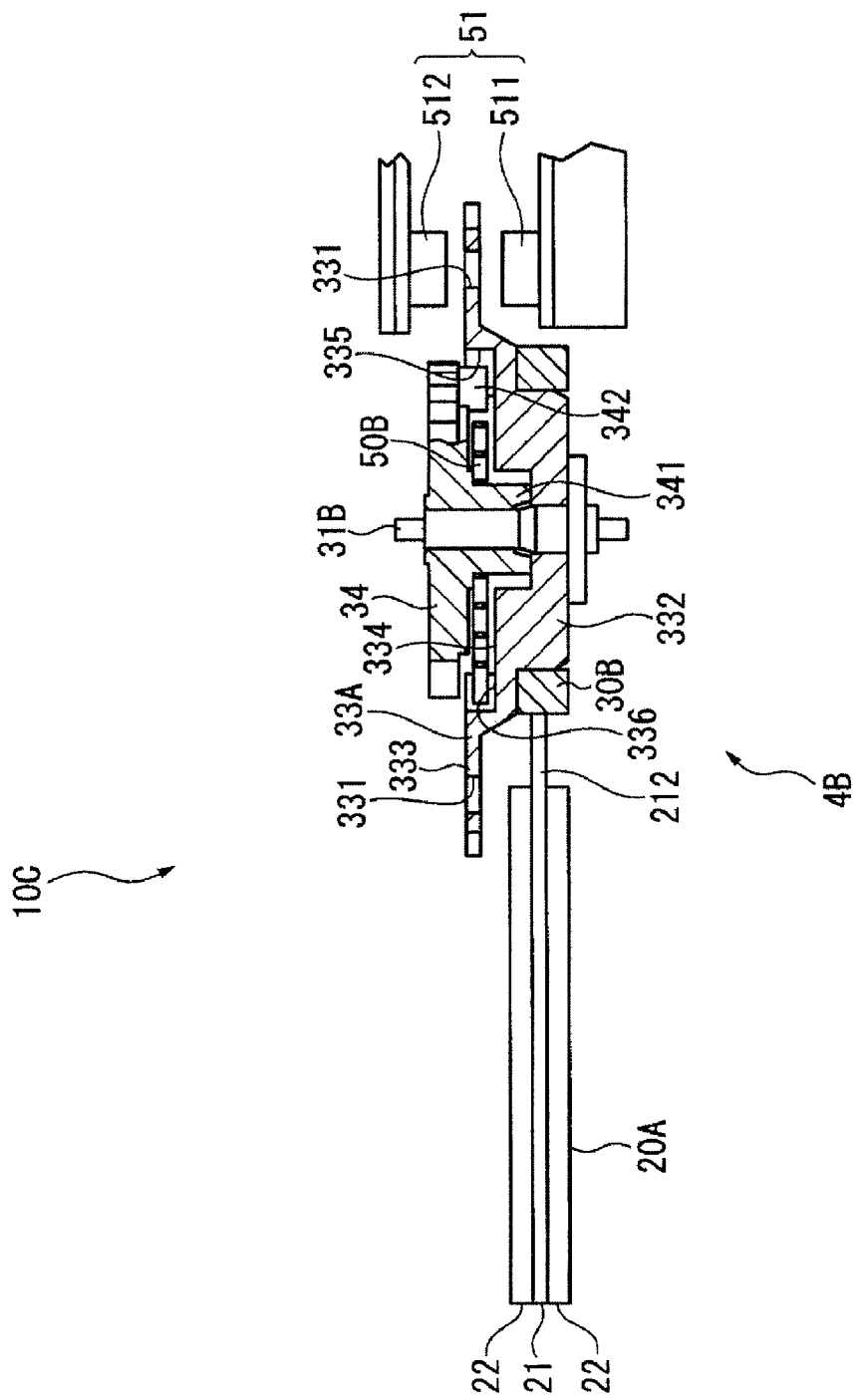
FIG. 21 is a longitudinal section view of the piezoelectric drive device.

As shown in FIG. 21, position detection holes 331 are formed in a rotor wheel part 333 of the rotor wheel base 332 passing through in the axial direction. The position detection holes 331 are formed at a 20° interval around the outside circumference with only a portion of the position detection holes 331 shown in FIG. 19.

A positioning notch 335 and a spring catch notch 336 are formed at substantially diametrically opposite positions on the inside of the spring recess 334. The outside end part of the spiral spring 50B is held in the spring catch notch 336, and the inside end part is wound and fastened to the barrel 341 of the rotor transmission wheel 34.

A positioning key 342 is disposed to the rotor transmission wheel 34 protruding toward the rotor wheel 33A, and is inserted to the positioning notch 335. In this embodiment of the invention the rotor transmission wheel 34 thus is a driven body, and the positioning key 342 and positioning notch 335 constitute a release limiting unit.

The drive wheel 9 and rotor transmission wheel 5C are positioned so that the follower teeth 65A and cam lobes 921 mesh.

A photointerrupter 51 is disposed on opposite sides of the position detection holes 331. The photointerrupter 51 is a transmission type detector that uses an emitter 511 and a receptor 512 to detect the position detection holes 331.

A reflection type detector such as a photoreflector can be used instead of this photointerrupter 51 to detect the position of the rotor wheel 33A by recognizing a detection pattern, for example, formed on the rotor wheel 33A.

In addition to the effects (1) to (14) of the invention described above, this embodiment also enables the following.

(15) Instead of disposing a separate rotating body (such as the first rotor transmission wheel 40) between the rotor ring 30B and the spiral spring 50B in order to transfer the drive power of the rotor ring 30B to the spiral spring 50B similarly to the arrangements of the first to third embodiments, and transmitting the drive power to the rotor transmission wheel 34 by means of this intervening rotating body, this embodiment of the invention reduces the load on the rotor ring 30B by the inertial moment of the separate rotating body by coaxially configuring the rotor ring 30B and the rotor transmission wheel 34. The piezoelectric actuator 4B can therefore be driven faster by the amount of this reduced inertial moment, the time that power is supplied to drive the piezoelectric actuator 4B a prescribed amount can be shortened, and power consumption can be reduced.

Embodiment 5

The piezoelectric drive device 10D in a timepiece according to a fifth embodiment of the invention is described next with reference to FIG. 22 and FIG. 23.

Figure 22:
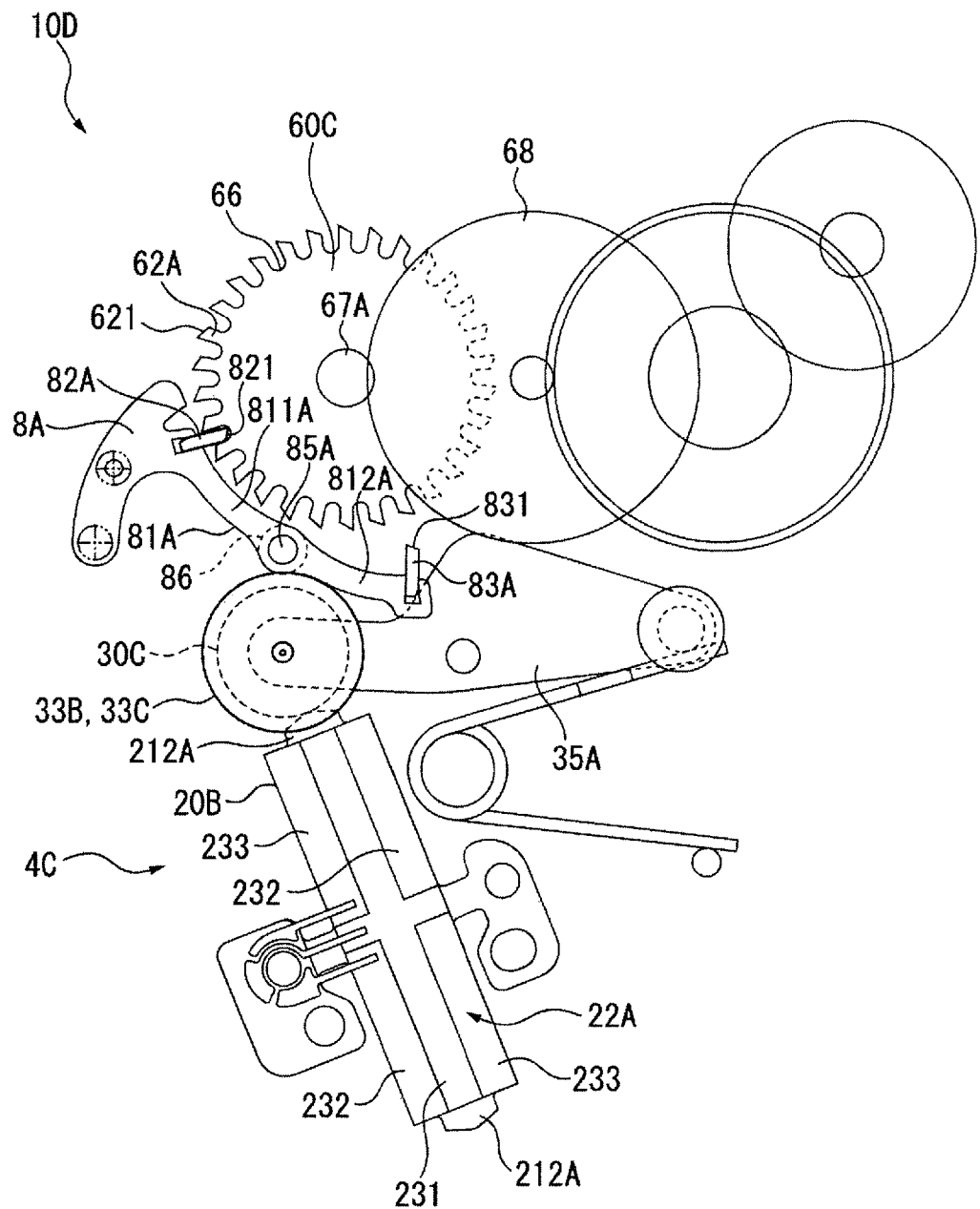
FIG. 22 is a plan view of a piezoelectric drive device according to a fifth embodiment of the invention.

FIG. 22 is a plan view of the piezoelectric drive device 10D in the timepiece. FIG. 23 is an exploded oblique view showing the construction of the piezoelectric drive device 10D.

The piezoelectric drive device 10D uses the drive force of a piezoelectric actuator 4C to swing the pallet fork 8A of a reverse escapement, makes the reverse escape wheel 60C (second driven body) to rotate as a result of the pallet fork 8A contacting the escape teeth 62A of the reverse escape wheel 60C, and uses the spiral spring 50 transmission mechanism in the piezoelectric drive device 10 of the first embodiment for part of the transmission mechanism from the rotor ring 30C to the reverse escape wheel 60C.

As shown in FIG. 22 the piezoelectric drive device 10D includes the piezoelectric actuator 4C, the reverse escapement pallet fork 8A as a swinging means, and the reverse escape wheel 60C.

An electrode is formed by a plating layer on both sides of the piezoelectric elements 22A of the vibrator 20B of the piezoelectric actuator 4C. This embodiment has a cross-shaped drive electrode 231 and rectangular drive electrodes 232 and 233 that are isolated from each other by grooves in the plating layer. The piezoelectric elements thus have a five-part structure as a result of these drive electrodes 231 to 233. By switching the drive electrodes 232, 233 to which voltage is applied when voltage is applied to the drive electrodes 231 to 233, the contact unit 212A can be caused to vibrate clockwise or counterclockwise on an elliptical path.

The rotor ring 30C of the piezoelectric actuator 4C is supported rotatably on the support arm 35A, and is urged by the contact unit 212A of the piezoelectric actuator 4C. When the contact unit 212A of the piezoelectric actuator 4C vibrates on a clockwise or counterclockwise substantially elliptical path, suitable friction force is produced between the contact unit 212A and rotor ring 30C, the drive force of the piezoelectric actuator 4C is transmitted to the rotor wheels 33B and 33C, and the rotor wheels 33B and 33C rotate clockwise or counterclockwise.

The reverse escapement pallet fork 8A includes a pallet body 81A, two claws 82A and 83A, and a wheel (pallet pinion) 86.

The pallet body 81A has a first arm part 811A, second arm part 812A, and pallet pivot pin 85A. The pallet body 81A is supported on the main plate, for example, so that the pallet body 81A can swing on the pallet pivot pin 85A.

The first arm part 811A and second arm part 812A extend to opposite sides from the pallet pivot pin 85A. The claw 82A is affixed to the first arm part 811A, and the claw 83A is affixed to the second arm part 812A.

The pallet pinion 86 is fit onto the pallet pivot pin 85A and mates with the rotor wheels 33B and 33C. Drive power from the rotor wheels 33B and 33C is thus transferred to the reverse escapement pallet fork 8A.

Each of the rotor wheels 33B and 33C has 36 teeth, and the pallet pinion 86 has nine teeth. The acceleration ratio of the speed of the reverse escapement pallet fork 8A to the speed of the rotor wheels 33B and 33C is thus 4×. More specifically, when the rotor wheels 33B and 33C rotate 6°, the pallet fork rotates 24°.

The two claws 82A and 83A are disposed at two locations on opposite sides of the pallet pivot pin 85A of the pallet body 81A. A beveled face 821, 831 is formed on the distal end of the two claws 82A and 83A. These beveled faces 821, 831 are provided to apply torque to the reverse escape wheel 60C when the reverse escapement pallet fork 8A swings and the claws 82A and 83A contact the escape teeth 62A of the reverse escape wheel 60C described below.

The reverse escape wheel 60C is a gear with 30 escape teeth 62A, and is supported rotatably on the main plate. The reverse escape wheel 60C is positioned to engage the claws 82A and 83A of the reverse escapement pallet fork 8A, and a seconds hand not shown is attached to the reverse escape wheel 60C.

A beveled face 621 that contacts the beveled faces 821, 831 of the two claws 82A and 83A is formed to the distal end of the escape teeth 62A. The tooth space 66 engaged by the two claws 82A and 83A is formed between the escape teeth 62A so that when the reverse escape wheel 60C rotates the angle of rotation of the reverse escape wheel 60C is limited to a constant angle. The two claws 82A and 83A constitute the rotation limiting unit of the invention in this embodiment.

More specifically, when the reverse escapement pallet fork 8A swings in a first direction (counterclockwise) and the one claw 83A of the reverse escapement pallet fork 8A contacts an escape tooth 62A of the reverse escape wheel 60C, the escape tooth 62A is pushed to rotate counterclockwise and the reverse escape wheel 60C rotates in a specific direction. Rotation of the reverse escape wheel 60C is also limited to a constant angle as a result of the claw 83A of the reverse escapement pallet fork 8A engaging the tooth space 66 of the reverse escape wheel 60C.

When the reverse escapement pallet fork 8A rotates in a second direction (clockwise), the claw 83A of the reverse escapement pallet fork 8A separates from the tooth space 66 and releases the reverse escape wheel 60C, the other claw 82A of the reverse escapement pallet fork 8A contacts another escape tooth 62A, the escape tooth 62A is pushed to rotate counterclockwise, and the reverse escape wheel 60C rotates in the same direction. Rotation of the reverse escape wheel 60C is also limited to a constant angle as a result of the claw 82A of the reverse escapement pallet fork 8A engaging the tooth space 66 of the reverse escape wheel 60C.

A gear (escape pinion) 67A is attached to the reverse escape wheel 60C coaxially to the axle of the reverse escape wheel 60C, and the escape pinion 67A mates with the third wheel 68.

Figure 23:
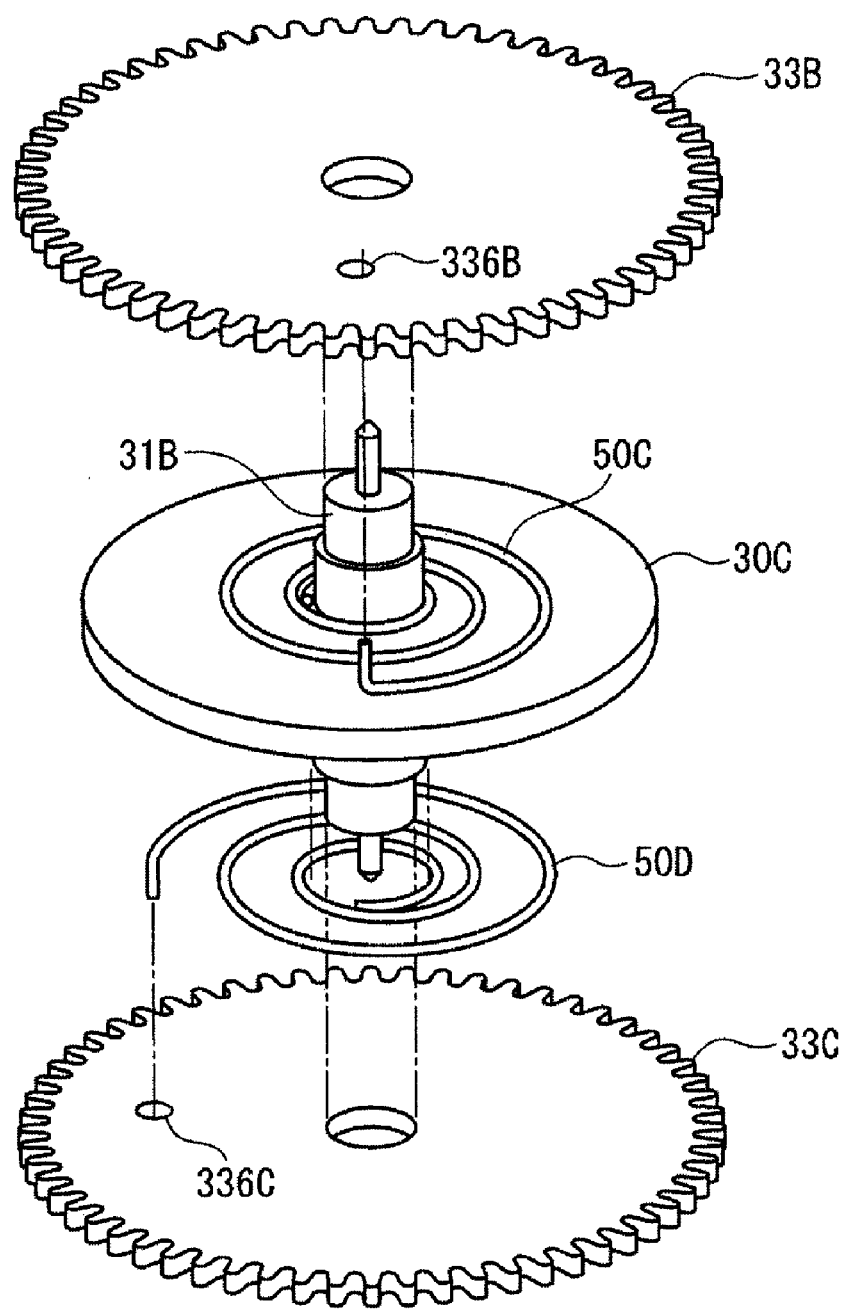
FIG. 23 is an oblique view of the main parts of the piezoelectric drive device.

As shown in FIG. 23, the rotor ring 30C is fixed to the rotor axle 311B, and rotates in unison with the rotor axle 31B. The first rotor wheel 33B and second rotor wheel 33C are supported rotatably on the rotor axle 311B with the rotor ring 30C therebetween. A spring catch hole 336B and 336C is formed in first and second rotor wheels 33B and 33C, respectively.

A first spiral spring 50C is disposed between the rotor ring 30C and the first rotor wheel 33B, and a second spiral spring 50D is disposed between the rotor ring 30C and the second rotor wheel 33C.

The first spiral spring 50C is formed by winding spring wire clockwise. The outside end of the spring is held in the spring catch hole 336B, and the inside end is wound and affixed to the rotor axle 311B. The first spiral spring 50C is elastically deformed in the direction increasing the number of windings as a result of the rotor ring 30C rotating counterclockwise in advance of the first rotor wheel 33B, and thus stores the counterclockwise drive force transmitted to the rotor ring 30C as elastic energy.

The second spiral spring 50D is formed by winding spring wire counterclockwise. The outside end of the spring is held in the spring catch hole 336C, and the inside end is wound and affixed to the rotor axle 31B. The second spiral spring 50D is elastically deformed in the direction increasing the number of windings as a result of the rotor ring 30C rotating clockwise in advance of the second rotor wheel 33C, and thus stores the clockwise drive force transmitted to the rotor ring 30C as elastic energy.

The rotor ring 30C is the rotor, and the first rotor wheel 33B and second rotor wheel 33C constitute a driven body in this embodiment of the invention.

As in the other embodiments of the invention, this embodiment also has a detection circuit for detecting how much the rotor has rotated to control driving the piezoelectric actuator 4C.

Operation of this piezoelectric drive device 10D is described next.

When the reverse escapement pallet fork 8A swings in the first direction (counterclockwise), the reverse escape wheel 60C rotates an angle of rotation equal to half the pitch of the teeth. When the reverse escapement pallet fork 8A swings in the second direction (clockwise), the reverse escape wheel 60C again rotates an angle of rotation equal to half the tooth pitch. By repeating this operation the swinging of the reverse escapement pallet fork 8A allows the reverse escape wheel 60C to rotate intermittently in half pitch increments. The second hand 91 attached to the reverse escape wheel 60C thus moves in one-second steps.

In addition to the effects of the invention described above, this embodiment also enables the following.

(16) By using an elastic device by means of the first and second spiral springs 50C and 50D, the load on the piezoelectric actuator 4C is reduced, the speed of the rotor ring 30C can be increased, the time required to advance a desired number of steps can be shortened, and power consumption can be reduced.

Other Variations of the Invention

The invention is not limited to the embodiments described above, and variations and improvements achieving the same object are included in the scope of the present invention.

For example, the first embodiment describes a release limiting unit having a positioning hole 42 in the first rotor transmission wheel 40 and a positioning pin 61 disposed to the second rotor transmission wheel 60, but the positioning pin could be disposed to the first rotor transmission wheel 40 and the positioning hole to the second rotor transmission wheel 60.

Furthermore, the release limiting unit can be any means of holding the initial deflection of an elastic device, and methods of engagement other than using a pin and hole, such as using protrusions that can contact each other on the first and second rotor transmission wheels, can be used instead.

As described above, the first embodiment uses a spiral spring 50 as the elastic device and disposes the spiral spring 50 with the outside circumference end fastened to the first rotor transmission wheel 40 and the inside end fastened to the second rotor transmission wheel 60 in the direction causing deformation of the spiral spring 50 to increase when the first rotor transmission wheel 40 rotates faster than the second rotor transmission wheel 60 in the drive direction of the piezoelectric actuator. However, the spiral spring could be wound in the opposite direction and the installation of the spring reversed. More specifically, the end at the inside center of the spiral spring could be attached to the first rotor transmission wheel and the outside end attached to the second rotor transmission wheel in the direction increasing deformation of the spiral spring when the first rotor transmission wheel rotates first (a left-winding spiral when the spiral spring is seen from the second rotor transmission wheel side).

A spiral spring is used as the elastic device in the foregoing embodiments, but the invention is not so limited and a U-shaped spring, a cantilevered spring, or a coil spring, for example, can be used. The spiral spring 50 is also described as being made from spring wire with a round section, but spring wire that is flat or rectangular in section, for example, can be used.

A detection means for detecting movement of the rotor wheel 33A is described in the fourth embodiment, but the detection means could detect movement of the rotor ring 30B. The detection means is also not limited to optical detection methods, and a magnetic or mechanical (using mechanical contacts or engaging/disengaging members) detector can be used, for example. However, considering susceptibility to the effects of external magnetic fields, an optical detection means is preferred.

The second embodiment has one piezoelectric actuator and this single piezoelectric actuator is the drive power source for both the first transmission path and the second transmission path. Alternatively, however, a first piezoelectric actuator for first transmission path drive and a second piezoelectric actuator for second transmission path drive can be separately provided.

For example, the vibrator of the first piezoelectric actuator could drive the intermediate wheel 6 or rotor transmission wheel 40A in FIG. 11, and the vibrator of the second piezoelectric actuator could drive the rotor ring 30 (separated so that it does not engage the intermediate wheel 6) in FIG. 11 or a rotor member separately affixed to the cam wheel 7.

In the second embodiment the cam 72 of the cam wheel 7 rotates inside the fork 84 of the pallet fork 8 to swing the pallet fork 8, but the method of swinging the pallet fork 8 is not limited to this arrangement. For example, a bearing hole member (made from ruby or other hard material) can be pressed into a bearing hole instead of the fork at the position where the fork 84 is located in the pallet fork 8, an eccentric pin can be disposed to the cam wheel 7 eccentrically to the axis of rotation, and this eccentric pin can be inserted to the bearing hole. This arrangement affords a two-way swinging mechanism that has a smaller plane area and is more efficient than the arrangement of the second embodiment because mechanical loss is less as a result of low friction between the bearing hole and the eccentric pin, a short contact radius, outflow of lubrication oil added to the contact part being inhibited by the surface tension.

The fifth embodiment describes a reverse escapement mechanism using a piezoelectric actuator that can drive in two directions. Alternatively, a one-way drive piezoelectric actuator can be used to swing the reverse escapement pallet fork by means of a cam mechanism.

A hand 2 is used by way of example as the driven object of the piezoelectric drive device. This hand 2 could be the second hand, minute hand, or hour hand, or a combination thereof. The driven body is also not limited to a hand 2, and a rotating body such as the calendar wheel of a timepiece could be driven.

The elastic energy of the elastic device makes a driven body to rotate in the foregoing embodiments, but the driven body that is driven by the elastic device is not limited to rotationally driven bodies. Examples of non-rotational drive include linear drive, bidirectional linear drive, and bidirectional arc drive.

For example, a pinion can be disposed in unison with the bottom of a rotor that is rotationally driven by the piezoelectric vibrator so that a rack having ratchet teeth that mesh with the teeth of the pinion is driven linearly. Elastic energy can be stored in an elastic device (such as a coil spring) that is disposed at an end of the rack and expands and contracts in line with the direction in which the rack is driven. The elastic energy of this elastic device can then be released at an appropriate timing so that the driven device disposed at the end of the elastic device is driven linearly. This driven device then returns to the original position after it is driven linearly to a prescribed position. When the driven device returns to the original position, the elastic device is pressed and the rack is also pushed back. The rack returns to the original position while moving to escape the outside of the pinion, the pinion teeth mate with the ratchet tooth of the rack and the rack is positioned.

When the rack is driven linearly, the piezoelectric vibrator can contact and linearly drive the rack directly without using a rotor.

The piezoelectric drive device of the invention is not limited to use in timepieces and can be used as a drive power source in electronic devices. Examples of electronic devices having a piezoelectric drive device according to the present invention include instruments that use the piezoelectric drive device to drive an indicator needle, and electronic devices that use a piezoelectric drive device to drive a driven body such as a turntable. More particularly, the piezoelectric drive device of the invention offers superior magnetic resistance than a stepping motor, and therefore can be widely used as a driver that requires magnetic resistance.

The best modes and methods of achieving the present invention are described above, but the invention is not limited to these embodiments. More specifically, the invention is particularly shown in the figures and described herein with reference to specific embodiments, but it will be obvious to one with ordinary skill in the related art that the shape, material, number, and other detailed aspects of these arrangements can be varied in many ways without departing from the technical concept or the scope of the object of this invention.

Therefore, description of specific shapes, materials and other aspects of the foregoing embodiments are used by way of example only to facilitate understanding the present invention and in no way limit the scope of this invention, and descriptions using names of parts removing part or all of the limitations relating to the form, material, or other aspects of these embodiments are also included in the scope of this invention.

The invention being thus described, it will be obvious that it may be varied in many ways. Such variations are not to be regarded as a departure from the spirit and scope of the invention, and all such modifications as would be obvious to one skilled in the art are included within the scope of the following claims.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A piezoelectric drive device comprising:
    a piezoelectric actuator that has a vibrator with a piezoelectric element and a rotor configured to be rotated by the vibrator;
    an elastic device having elasticity and configured to store rotational energy of the rotor;
    a driven body configured to be rotated by the elastic device;
    a rotor transmission wheel; and
    a release limiting unit configured to hold initial deflection of the elastic device and configured between the rotor transmission wheel to which rotational energy is transmitted and the driven body, or between the rotor and driven body,
    the elastic device being disposed between the rotor and the driven body.

2. The piezoelectric drive device according to claim 1, further comprising
    a rotation limiting device that limits an angle of rotation of the driven body to a prescribed angle.

3. The piezoelectric drive device according to claim 2, further comprising
    a first transmission path where the rotational energy of the rotor is transmitted to the rotation limiting device without passing through the elastic device, and
    a second transmission path where the rotational energy of the rotor is transmitted to the driven body through the elastic device.

4. The piezoelectric drive device according to claim 2, wherein
    the rotation limiting device is engaged with the driven body.

5. The piezoelectric drive device according to claim 2, wherein
    the driven body is an escape wheel, and
    the rotation limiting device is a pallet fork.

6. The piezoelectric drive device according to claim 5, further comprising
    a cam member that engages the pallet fork and is driven by the piezoelectric actuator, and is configured to make the pallet fork bidirectionally swing once when the cam member rotates once.

7. The piezoelectric drive device according to claim 2, wherein the driven body and the rotation limiting device form a Geneva mechanism.

8. The piezoelectric drive device according to claim 1, wherein the elastic device includes a spiral spring.

9. The piezoelectric drive device according to claim 1, further comprising wherein
    the rotor transmission wheel and the driven body are disposed on the same axle, and
    the elastic device has a first end engaged with the rotor transmission wheel and a second end engaged with the driven body.

10. The piezoelectric drive device according to claim 1, wherein the rotor and the driven body are disposed on the same axle; and
    the elastic device has a first end engaged with the rotor and a second end engaged with the driven body.

11. The piezoelectric drive device according to claim 1, wherein
    the release limiting unit has looseness permitting rotation of the rotor transmission wheel or the rotor only in the direction increasing the deflection of the elastic device, and
    a maximum deflection of the elastic device is set on the basis of the looseness in the release limiting unit.

12. The piezoelectric drive device according to claim 11, wherein the piezoelectric actuator drives in steps,
the looseness in the release limiting unit is an amount of rotation of the rotor transmission wheel or the rotor, and
the amount of rotation corresponds to at least one drive step of the piezoelectric actuator.

13. The piezoelectric drive device according to claim 1, further comprising:
a swinging means that is swung alternately in first and second directions by the driven body, and
a second driven body configured to be rotated in a constant direction by the swinging means each time when the swinging means is swung in the first and second directions, wherein
the swinging means has a rotation limiting unit that limits an angle of rotation of the second driven body to be constant.

14. The piezoelectric drive device according to claim 1, further comprising
a pressure means that pushes either one of the vibrator and the rotor to the other of the vibrator and the rotor, wherein
the vibrator is formed as a flat plate and has a contact unit that contacts an outside surface of the rotor.

15. An electronic device comprising
the piezoelectric drive device of claim 1, and
a driven unit configured to be driven by the piezoelectric drive device.

16. The electronic device according to claim 15, further comprising
a time keeping unit, wherein
the driven unit is a time information display unit that displays time information kept by the timekeeping unit.

17. The piezoelectric drive device according to claim 1, wherein
the release limiting unit includes a positioning hole configured on the rotor transmission wheel and a pin having first and second ends, the pin being connected to the driven body at the first end and inserted in the positioning hole at the second end opposite to the first end.

* * * * *